US010083358B1

(12) United States Patent
Shin et al.

(10) Patent No.: US 10,083,358 B1
(45) Date of Patent: Sep. 25, 2018

(54) ASSOCIATION OF UNIQUE PERSON TO POINT-OF-SALE TRANSACTION DATA

(71) Applicants: Joonhwa Shin, State College, PA (US); Rajeev Sharma, State College, PA (US); Youngrock Yoon, Knoxville, TN (US); Donghun Kim, State College, PA (US)

(72) Inventors: Joonhwa Shin, State College, PA (US); Rajeev Sharma, State College, PA (US); Youngrock Yoon, Knoxville, TN (US); Donghun Kim, State College, PA (US)

(73) Assignee: VideoMining Corporation, State College, PA (US)

( * ) Notice: Subject to any disclaimer, the term of this patent is extended or adjusted under 35 U.S.C. 154(b) by 0 days.

(21) Appl. No.: 15/220,052

(22) Filed: Jul. 26, 2016

(51) Int. Cl.
*G06K 9/00* (2006.01)
*G06K 9/62* (2006.01)

(52) U.S. Cl.
CPC ..... *G06K 9/00718* (2013.01); *G06K 9/00261* (2013.01); *G06K 9/00288* (2013.01); *G06K 9/6296* (2013.01); *G06K 2009/00738* (2013.01)

(58) Field of Classification Search
CPC .......... G06K 9/00718; G06K 9/6296; G06K 9/00288; G06K 9/00261; G06K 2009/00738
See application file for complete search history.

(56) References Cited

U.S. PATENT DOCUMENTS

| 7,232,064 | B1 * | 6/2007 | Toohey ............... G06F 17/3028 235/384 |
| 7,516,888 | B1 * | 4/2009 | Kundu .................... G06Q 20/00 235/375 |
| 7,792,256 | B1 * | 9/2010 | Arledge .............. H04L 12/2818 348/143 |
| 8,392,957 | B2 | 5/2013 | Holt et al. |
| 8,436,911 | B2 | 5/2013 | Leebow |
| 8,570,375 | B1 * | 10/2013 | Srinivasan ............. G06Q 20/20 235/383 |
| 8,622,286 | B2 | 1/2014 | Gazdzinski |
| 8,831,294 | B2 | 9/2014 | Krupka et al. |
| 8,891,835 | B2 | 11/2014 | Cheswick |

(Continued)

OTHER PUBLICATIONS

D. Lemire, "Faster Retrieval with a Two-Pass Dynamic-Time-Warping Lower Bound," Pattern Recognition 42(9): 2169-2180 (2009), Jun. 10, 2009, 26 pages.

*Primary Examiner* — John Strege

(57) ABSTRACT

A method and system for associating an image of a face of at least a person with Point-of-Sale (PoS) data by aligning a first event time series with a second event time series based on a dynamic time disparity. An exemplary embodiment can generate an event time series containing facial recognition data for a person or persons during the PoS transaction process. These data can form a vision-based checkout event time series. An embodiment can also collect PoS transaction data from the retail checkout system, using timestamp information to create a second event time series. As there may be a time disparity between the time series, they can then be aligned in order to match events from one time series to the other. Faces identified in checkout events in the first time series can be registered to PoS events and the results stored in a database.

16 Claims, 26 Drawing Sheets

(56) References Cited

U.S. PATENT DOCUMENTS

| | | |
|---|---|---|
| 9,033,226 B1 | 5/2015 | Gazdzinski |
| 9,135,500 B2 | 9/2015 | Steiner |
| 2008/0018738 A1* | 1/2008 | Lipton ............... G06K 9/00771 |
| | | 348/143 |
| 2008/0303902 A1* | 12/2008 | Romer ................ G07F 19/207 |
| | | 348/143 |
| 2009/0003662 A1 | 1/2009 | Joseph et al. |
| 2009/0252383 A1 | 10/2009 | Adam et al. |
| 2011/0013810 A1 | 1/2011 | Engström et al. |
| 2011/0257985 A1* | 10/2011 | Goldstein ......... G06F 17/30256 |
| | | 705/1.1 |
| 2012/0078700 A1 | 3/2012 | Pugliese et al. |
| 2013/0027561 A1* | 1/2013 | Lee ...................... G06Q 30/02 |
| | | 348/150 |
| 2013/0035979 A1* | 2/2013 | Tenbrock ............ G06Q 30/02 |
| | | 705/7.29 |
| 2013/0108114 A1 | 5/2013 | Aviad et al. |
| 2013/0259327 A1 | 10/2013 | Cheswick |
| 2013/0266194 A1* | 10/2013 | Brookhart .......... G06K 9/00288 |
| | | 382/118 |
| 2014/0172627 A1 | 6/2014 | Levy et al. |
| 2014/0379480 A1 | 12/2014 | Rao et al. |
| 2015/0006243 A1* | 1/2015 | Yuasa ................ G06Q 30/0201 |
| | | 705/7.29 |
| 2015/0242980 A1 | 8/2015 | Henry et al. |
| 2015/0363798 A1 | 12/2015 | Aihara et al. |
| 2016/0110702 A1* | 4/2016 | Landers, Jr. ....... G01G 19/4144 |
| | | 705/17 |
| 2017/0213444 A1* | 7/2017 | Hazzani ................ G08B 23/00 |
| 2017/0251183 A1* | 8/2017 | Crooks ................ G07G 1/0054 |

\* cited by examiner

Iteration 1: Mapping - Offset

2010

Iteration 3: Outlier Removal (10%) & Mapping - Offset

2012

Iteration 5: Outlier Removal (10%) & Mapping - Offset

2014

Iteration 7: Outlier Removal (10%) & Mapping - Offset

2016 time ⟶

Iteration 9: Outlier Removal (10%) & Mapping - Offset

2110

Iteration 11: Outlier Removal (10%) & Mapping - Offset

2112

Iteration 13: Final Alignment

2114 time ⟶

ASSOCIATION OF UNIQUE PERSON TO POINT-OF-SALE TRANSACTION DATA

BACKGROUND

Many retail stores could greatly benefit from the ability to match face recognition data to data obtained at a point-of-sale (PoS; i.e., checkout) location. While image analysis to identify faces can use one of many well-known techniques, identifying the face of a person at a PoS location and matching the appearance of the face with the corresponding transaction data remains a problem with a need for solution. The problem would be exacerbated if we do not assume a reasonably tight time synchronization between the video capture system and the PoS system. However, in reality, it is often the case where there could be random clock drifts between the two different systems, causing a mismatch between timestamp data in video capture devices and PoS systems. This creates the need for a time matching technique in order to synchronize data from both sources.

BRIEF SUMMARY OF THE INVENTION

A method and system for associating at least an image of a face of at least a person with Point-of-Sale (PoS) data by aligning a first event time series with a second event time series based on a dynamic time disparity, and utilizing at least a camera and at least a processor for executing the steps comprising generating a first event time series using an Event Time Series Generation module, generating a second event time series using the Event Time Series Generation module, aligning the first event time series with the second event time series based on the dynamic time disparity between the time series, using an Event Time Series Clock Alignment module, matching first time series events with second time series events based on the alignment of the time series, using an Event Matching module, registering face images from a series of checkout events to a series of PoS events using a Face-to-PoS Registration module, and storing the time series and registration data in a database.

Matching a person's face, as captured by a video camera during the checkout process in a store, to the PoS transaction data can be complicated by a couple factors. First, there is likely to be a disparity between the time stamp information contained in the video and that in the PoS transaction data. Second, there can be many people near the PoS (i.e., a checkout or cashier) location at the time when a transaction occurs, so identifying the person or group of people associated with the transaction can be a challenge.

An exemplary embodiment can generate an event time series containing facial recognition data for a person or persons during the PoS transaction process. This data can form a vision-based checkout event time series. An embodiment can also collect PoS transaction data from the retail checkout system, using timestamp information to create a second event time series. The time series can then be aligned in order to match events from one time series to the other. Faces identified in checkout events in the first event time series can be registered to PoS events in the second event time series and the results stored in a database.

DETAILED DESCRIPTION

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Further, while the steps provided are presented in a particular order, the process is not limited to the particular ordering of steps presented. Some embodiments may include steps in the same or different order than the steps provided in the process description.

Overview

Figure 1:
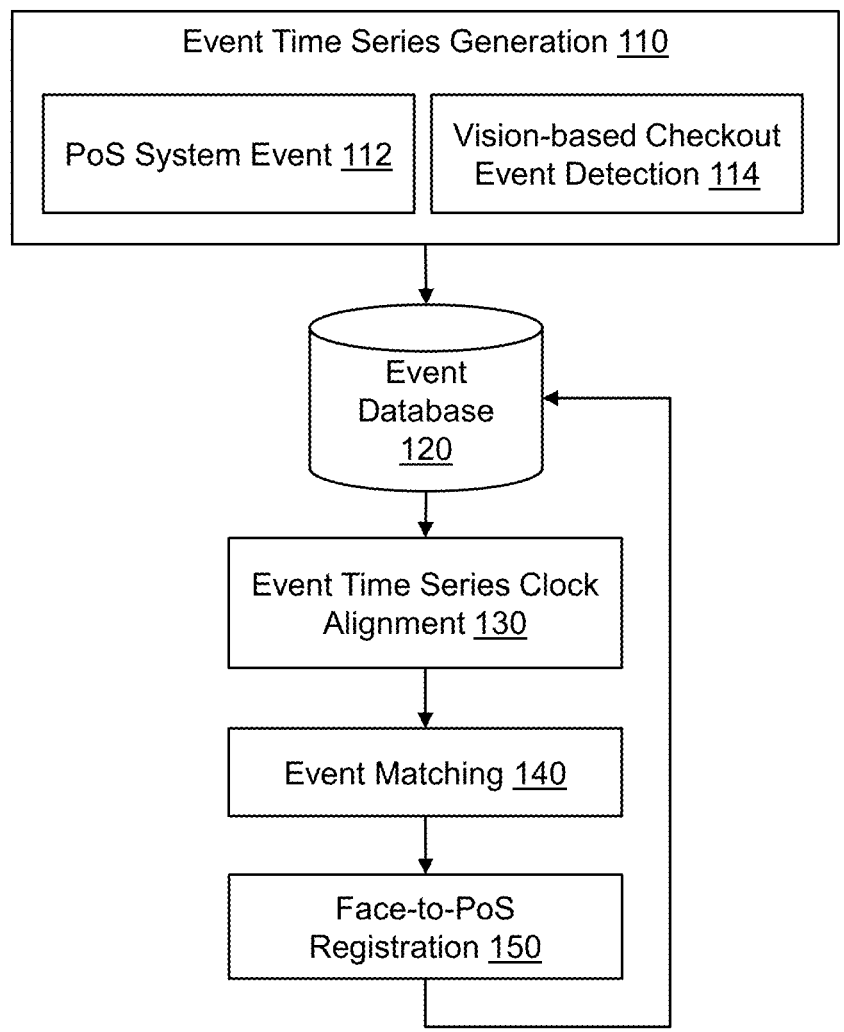
FIG. 1 shows an example block flow diagram of an embodiment of the face to PoS association process.

FIG. 1 shows a block flow diagram overview of an exemplary embodiment of the face to PoS association process. The process can begin with the generation of two event time series (ETSes) using the Event Time Series Generation 110 module. One event time series (ETS) can be generated using the PoS System Event 112 module, which can comprise a list of shopper transactions at a retail location along with a timestamp for each transaction. Another ETS can be generated using the Vision-based Checkout Event Detection 114 module. The Vision-based Checkout Event Detection 114 module can detect and track the faces of a shopper in the checkout line or making a purchase at the checkout area of a retail location. In addition, it can detect when a transaction has taken place. When tracking multiple faces in the checkout line, it can create groups of faces based on the time the persons leave the checkout area (for example, possibly indicating a family or group of friends shopping together). Further, it can make a determination of which tracked person in a group of persons was the transaction owner (i.e., the person who completed the purchase transaction; this is described in more detail below). An ETS can also include timestamps corresponding to the times when the purchases occurred, or when a shopper or a group of shoppers left the checkout area. Both types of ETS data can then be stored in an Event Database 120.

Both types of ETSes can then be processed by the Event Time Series Clock Alignment 130 module to determine an alignment of the timing information between the two ETSes. This alignment can be performed using a discrete or continuous Dynamic Time Warping (DTW)-like approach, or some other method. The alignment can be used to find correspondences between events on the sets of ETSes.

After the ETSes are aligned, the Event Matching 140 module can be used to determine a probability that events from each ETS are matched. A match can be an indication that the corresponding events from each ETS occurred at the same (or a similar) time.

Finally, given matched events on each ETS, the Face-to-PoS Registration 150 module can associate a face group with each PoS event. In some embodiments, a tree-like graph can be created to associate groups of faces from multiple persons with the same PoS event. This association can indicate the presence of a family, or other social group, that might shop together on other occasions. After registration of the face group to the PoS event, the data can then be used to update the Event Database 120.

More details about each of the modules, and other embodiments, will be provided below.

Event Time Series Generation

As illustrated in FIG. 1, the Event Time Series Generation 110 module can produce two separate ETSes, one based on the events from a PoS System, and the other from the events by vision-based checkout event detection.

The PoS System Event 112 module can obtain data containing Point-of-Sale (PoS) information for each checkout lane from a retail location. This PoS information can include a list of items purchased, the cost of the items, and total amount paid, after any price reductions were applied. It can also include a timestamp indicating the time that the transaction occurred. In an embodiment, it can be assumed that all checkouts at a retail location are synchronized to the same clock. In another embodiment, the timestamp from multiple checkouts must be synchronized. The collected PoS data from each transaction can form one ETS, $P=\{p_j\}$, for $j=1, \ldots, M$ PoS transactions, and can then be stored in the Event Database 120.

Figure 2:
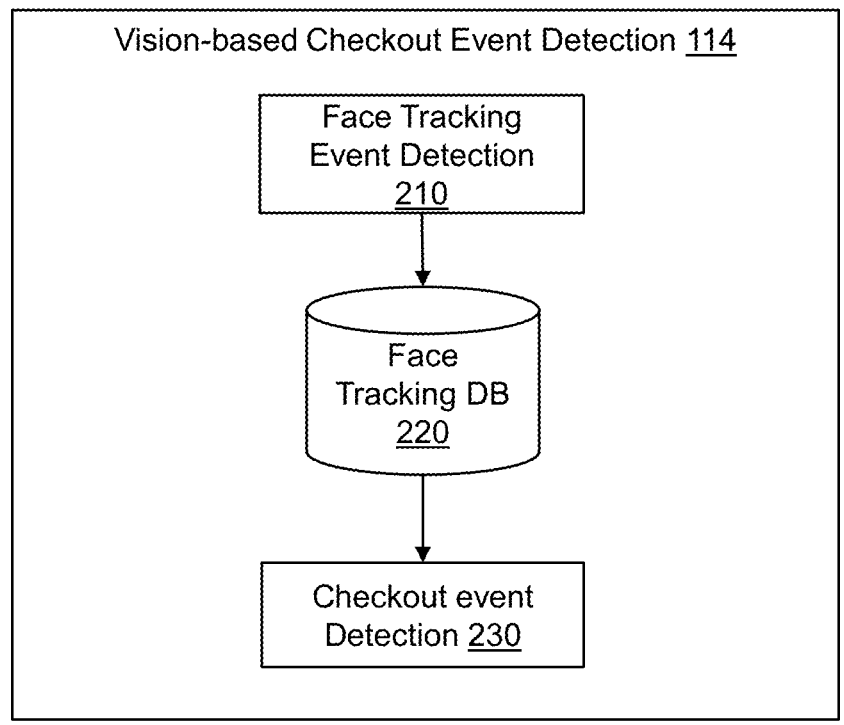
FIG. 2 shows an example block flow diagram of an embodiment of the Vision-based Checkout Event Detection module.

The Vision-based Checkout Event Detection 114 module can be used to detect when a shopper completes a transaction at a checkout area of a retail location. FIG. 2 shows a more detailed view of an embodiment of the Vision-based Checkout Event Detection 114 process. In the embodiment, a Face Tracking Event Detection 210 module can utilize a video stream from an installed camera near the checkout area to detect and track faces of people present in the checkout area. Data containing the tracked faces can be stored in the Face Tracking DB 220. Data from the Face Tracking DB 220 can be used to detect checkout events (i.e., when a purchase transaction occurs at the checkout) using the Checkout Event Detection 230 module (described below).

Figure 3:
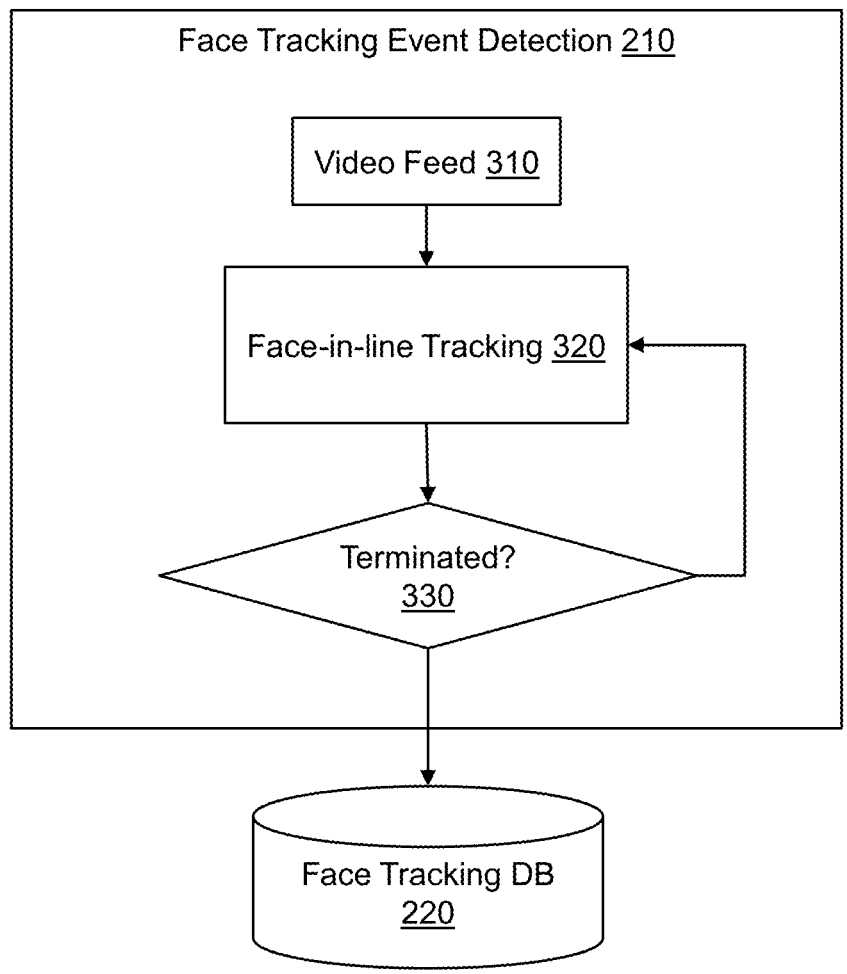
FIG. 3 shows an example block flow diagram of an embodiment of the Face Tracking Event Detection module.

FIG. 3 shows more details of an embodiment of the Face Tracking Event Detection 210 module. A Video Feed 310 containing an image stream showing persons while they are in the queue line near the checkout area can be received by the Face-in-line Tracking 320 module. In the embodiment, N can be the total number of persons tracked in the Video Feed 310. A face tracking event can be the tracking of a face (of one of the N persons tracked) that is captured in the image stream.

For N face tracking events, each face tracking event can be given as $f_i$ for $i=1, \ldots, N$. Each face tracking event $f_i$ can be a 4-tuple, such as $$f_i = <T_i, X_i, Y_i, S_i>,$$

where $T_i = \{t_{ik}\}$ for $k=1, \ldots, K_i$, can be the timestamps of tracked faces; $X_i = \{x_{ik}\}$ for $k=1, \ldots, K_i$ and $Y_i = \{y_{ik}\}$ for $k=1, \ldots, K_i$ can be the corresponding locations within each image of the tracked faces (for example, x and y coordinates in the image); Facial image data for the $i^{th}$ person can be $S_i = \{s_{i1}, s_{i2}, \ldots, s_{iK_i}\}$; and $K_i$ can be the length of the trajectory for the $i^{th}$ person.

In addition to the 4-tuple for each face tracking event $f_i$, for each tracked face, a unique person ID can be created.

The Face-in-line Tracking 320 can be Terminated 330 when the image of the person's face is no longer captured in the video stream, i.e., the person has left the checkout area. When the face tracking event is terminated, the tracked data, consisting of the person ID and the face tracking event data (the timestamp, the trajectory (tracked image locations), and the face images) can be stored in a Face Tracking DB 220.

Figure 4:
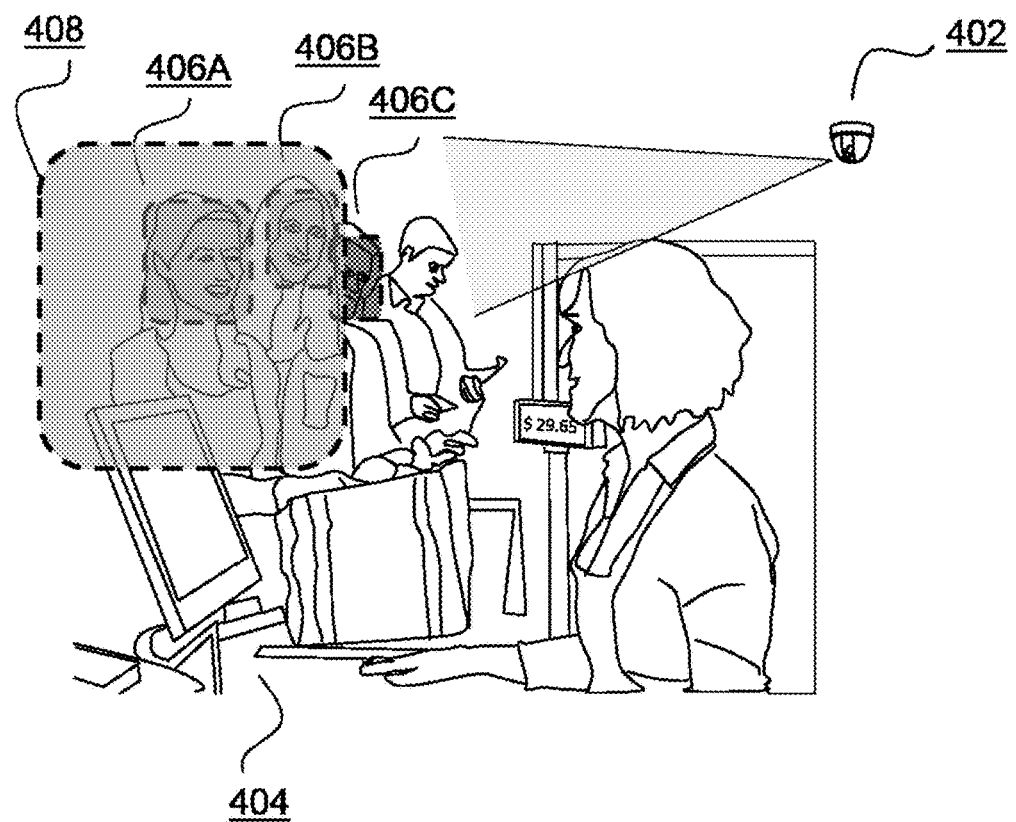
FIG. 4 shows an example embodiment of a video camera installed near a checkout area.

FIG. 4 shows an example embodiment of a video camera 402 installed near a checkout area 404. Persons whose faces can be tracked in the queue for checkout are shown in 406A-C. The checkout area can be designated as a region of interest within the field of view of the face images of the video stream near the checkout (i.e., where the transaction occurs). An example of the checkout area region of interest is illustrated in 408.

Figure 5:
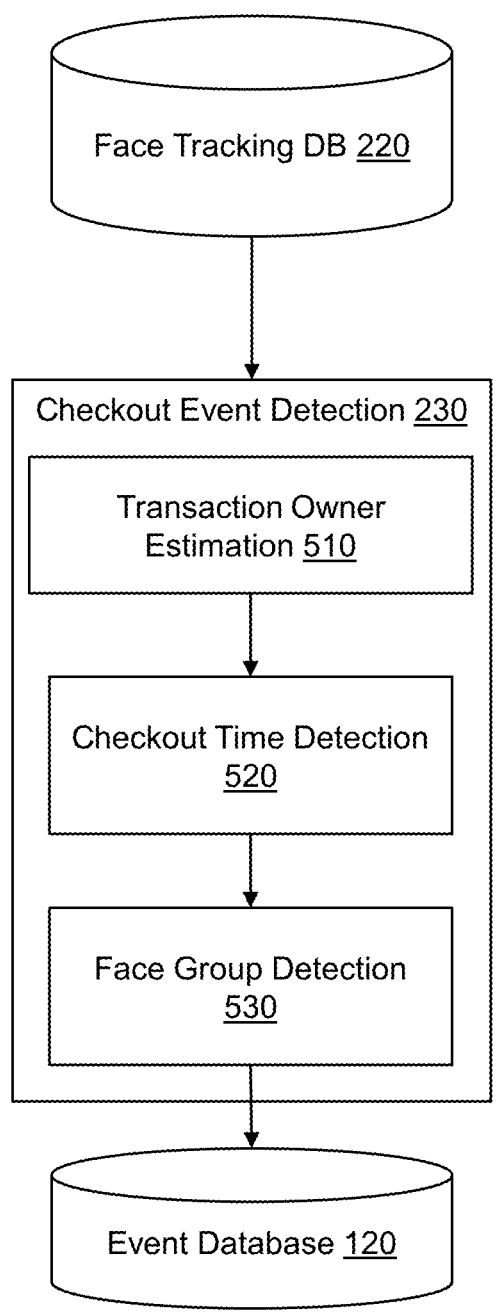
FIG. 5 shows more detail of an embodiment of the Checkout Event Detection module.

FIG. 5 shows more details of an embodiment of the Checkout Event Detection 230 module. The face tracking events for each tracked person, $$f_i = <T_i, X_i, Y_i, S_i> \text{ for } i=1, \ldots, N,$$

can be obtained from the Face Tracking DB 220.

First, the Transaction Owner Estimation 510 module can determine the transaction owner for each checkout event. The transaction owner can be the person most likely to have completed the transaction in the checkout area, such as illustrated in the example 408 in FIG. 4. Then, the checkout time for the transaction can be determined using the Checkout Time Detection 520 module. The Face Group Detection 530 module can then determine groups of faces that can be associated with the transaction owner. The checkout event data can then be stored in the Event Database 120.

Figure 6:
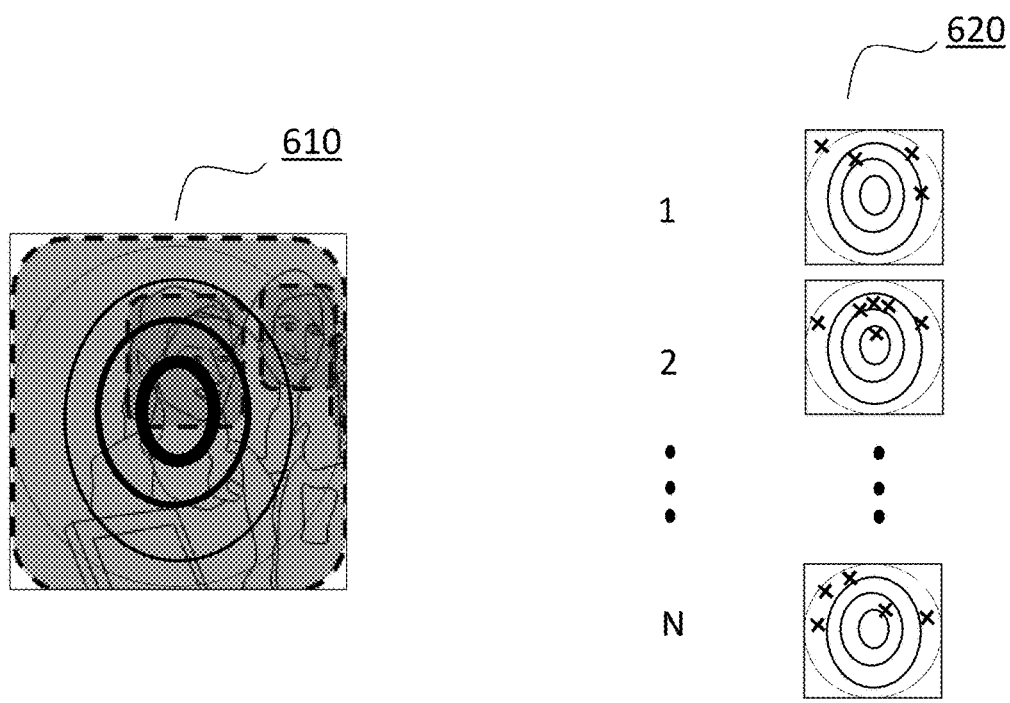
FIG. 6 shows an example of the Region of Interest within the image that the Transaction Owner Estimation module can use to provide the likelihood that a particular candidate is the transaction owner.

FIG. 6 shows an example of the Region of Interest 610 (ROI) within the image that the Transaction Owner Estimation 510 module can use to provide the likelihood that a particular candidate is the transaction owner. The ROI 610 can be applied as a 2D Gaussian-like weighted region. The ROI 610 can be chosen empirically through observation of the checkout area via the installed camera. The closer a face resides to the center of the region, the higher the likelihood can be that the person is the transaction owner. The module can then generate an occupancy map 620. For each tracked person i, for i=1, ..., N, and using the trajectory data ($X_i$, $Y_i$) the set of occupancy maps 620 can indicate locations where the persons were tracked in the ROI 610 (this is shown as small x's for each occupancy map in 620). Then the likelihood L(map(i)) that each person is the transaction owner can be calculated by the weighted sum of samples in the occupancy map (a higher likelihood value can be given based on closeness to the center of the "bull's eye"). The transaction owner p* can then be estimated using the following maximum likelihood equation, $$p^* = \mathrm{argmax}_i \{L(\mathrm{map}(i))\}.$$

Figure 7:
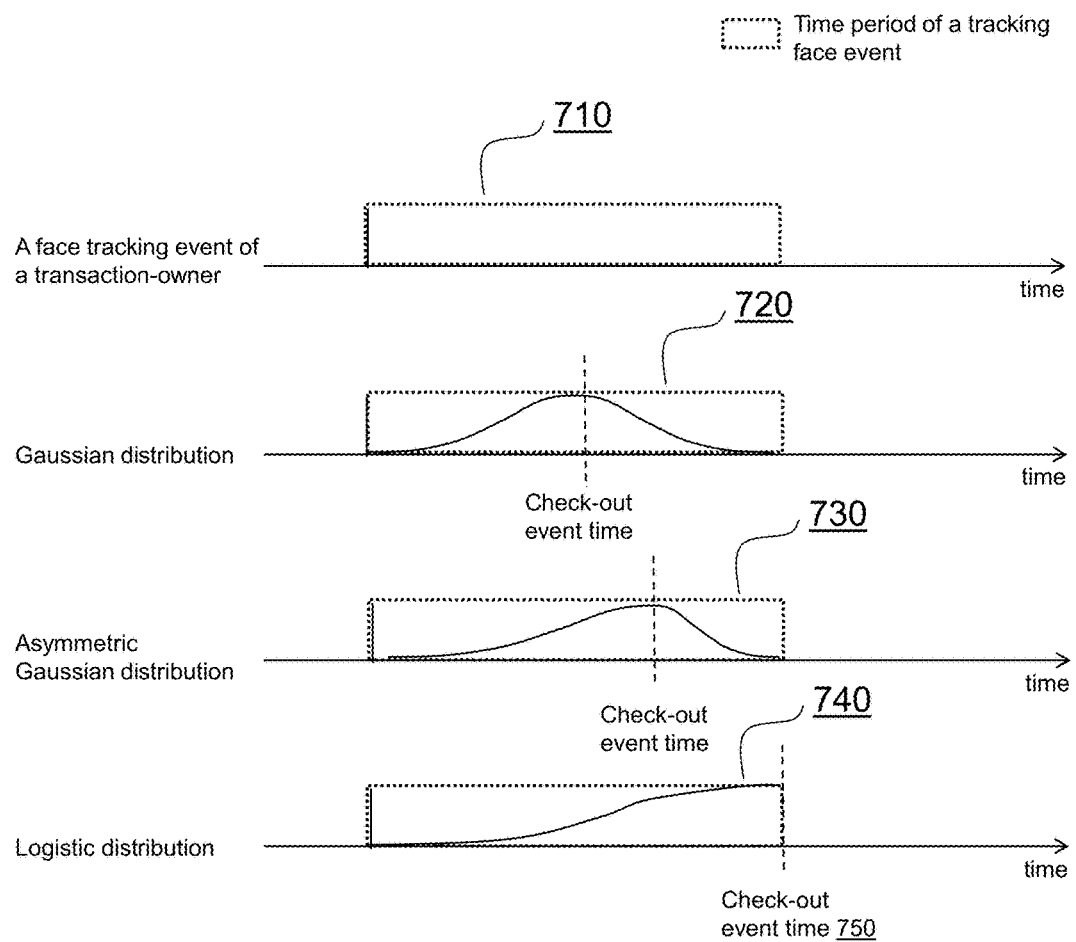
FIG. 7 illustrates an embodiment of the Checkout Time Detection module.

FIG. 7 illustrates an example of an embodiment of the Checkout Time Detection 520 module. The time period for a face tracking event associated with a transaction owner can be determined, as shown in 710. The possible time for a checkout event can be modeled, for example, using empirical data to establish probability based on a specific distribution, such as a Gaussian distribution 720, an asymmetric Gaussian distribution 730, or a logistic distribution 740. Then, the checkout event time, $t_C$, can be determined by choosing the time with the maximum probability based on the chosen distribution. For example, when we choose the logistic distribution-based checkout event model, checkout event time 750 is the time at the end of a face tracking event.

Figure 8:
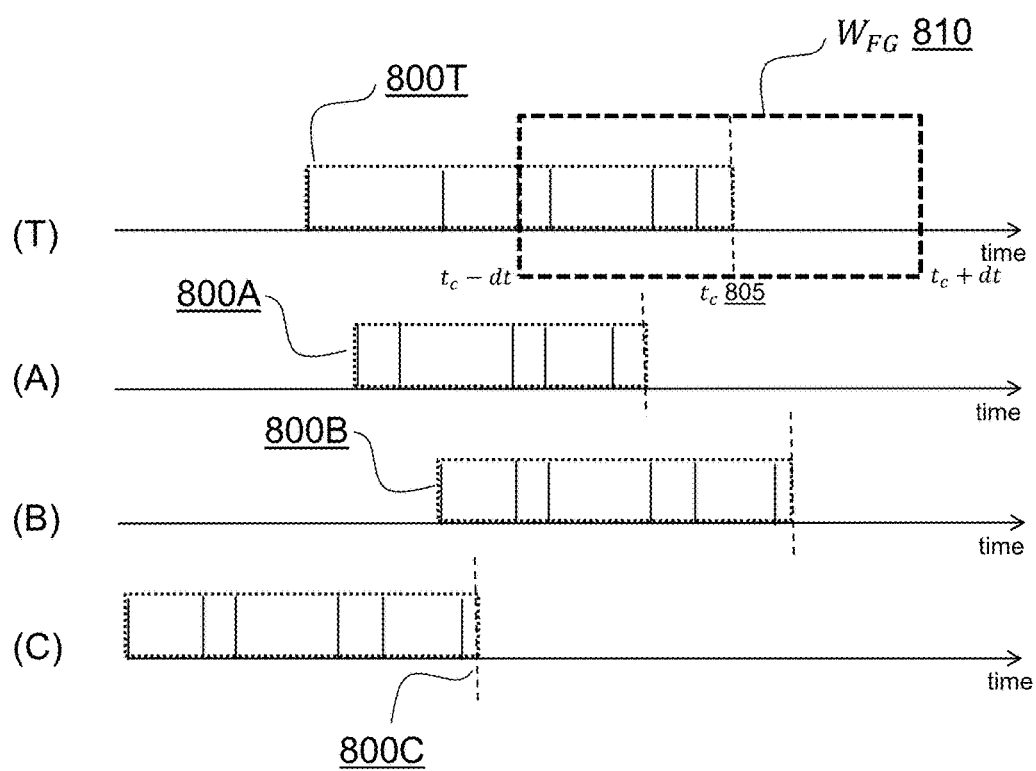
FIG. 8 illustrates an example of an embodiment of the Face Group Detection module.
Figure 8:
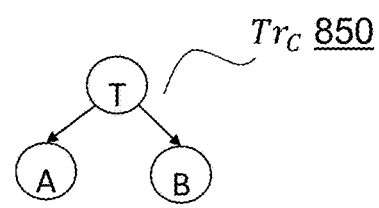

FIG. 8 illustrates an example of an embodiment of the Face Group Detection 530 module. When multiple faces are detected in the checkout area around the time of a checkout event, the Face Group Detection 530 module can group faces that move through the checkout area at the same time. The face group can be, for example, a family (i.e., parent with children), group of friends, or other group that can be shopping in the store together. Each group can have a transaction owner who makes the actual purchase. In this example, the face tracking event for the transaction owner is shown in 800T. The time extent of the face tracking events for persons A, B, and C are shown in 800A, 800B, and 800C, respectively.

First, given the checkout event time, $t_c$ 805, of the transaction owner (denoted as Person T in FIG. 8), the face grouping time window 810 ($W_{FG}$) can be built with a certain time extent, dt, such as $t_c - dt < t_c < t_c + dt$. Then, a search can be done to find all face tracking events whose end time fall within the face grouping time window 810. The face tracking events, $f_i$, that satisfy the search (persons A and B in this example, since the end times for face tracking events 800A and 800B fall within the time window 810) can be aggregated as a face group, $G_S^{tc}$, (in this example, persons T, A, and B) of the checkout event. After the face group is formed, a face tree, $Tr_C$ 850, can be formed from the relationship of the faces to the transaction owner.

In this example, the face grouping time window 810 is generated based on the face tracking event 800T for transaction owner T. Face tracking events for persons A 800A, B 800B, and C 800C are then shown relative to T. It can be seen that the end time for face tracking events A and B fall within the face grouping time window 810, and so are included in the face group for event T, $G_S^{tc}$. Since the end time for the face tracking event for person C 800C does not fall within the face grouping time window 810 ($W_{FG}$), it is not included in the face group for event T. The tree illustrating the face group for event T, $Tr_C$, is shown in 850.

The ETS data generated by the Vision-based Checkout Event Detection 114 module, $$C = \{t_C, G_S^{tc}, Tr_C\},$$

can then be passed to the Event Database 120.

Figure 9:
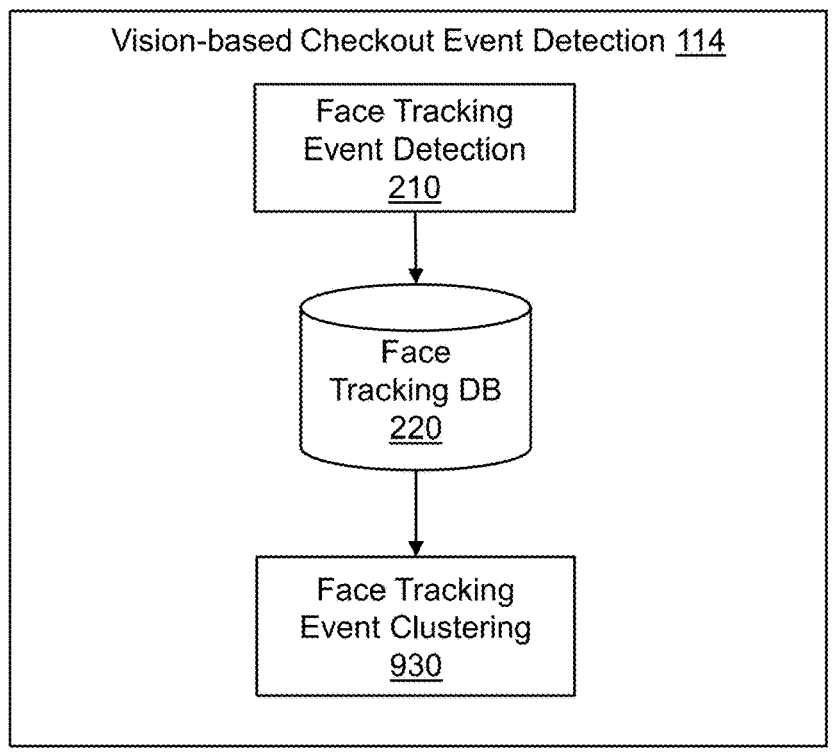
FIG. 9 shows a more detailed view of another embodiment of the Vision-based Checkout Event Detection module.

FIG. 9 shows a detailed view of another embodiment of the Vision-based Checkout Event Detection 114 module. The Face Tracking Event Detection 210 module and Face Tracking DB 220 can be implemented as described in the previous embodiment. For this embodiment, a list of face tracking events can be described as $F = \{f_i\}$ for i=1, ..., N, where N is the total number of face tracking events. In this embodiment, groups of tracked faces of shoppers can be found using the Face Tracking Event Clustering 930 module. The Face Tracking Event Clustering 930 module can be used to group the events in F by first sorting, then clustering the face tracking events using the ending time stamp. The clustered face tracking events can form the set of checkout events $C = \{c_k\}$, for k=1, ..., M, where M is the number of checkout events.

Figure 10:
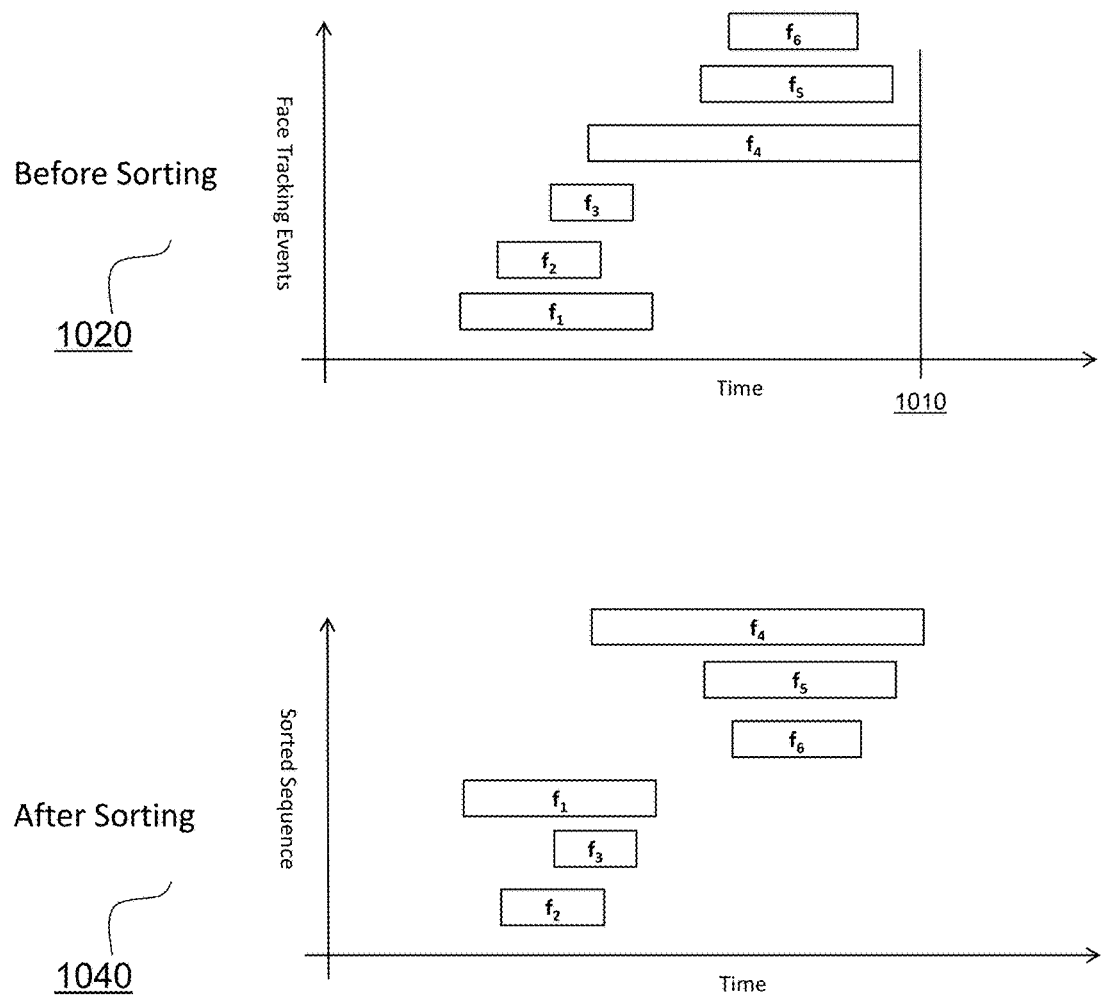
FIG. 10 illustrates an example sequence of face tracking events and the time when they occur.

FIG. 10 illustrates an example sequence of face tracking events (F) and the time when they occur. In this embodiment, $t_e(f_i)$ can be the end time stamp of an event $f_i$ in F. In the example shown in FIG. 10, the ending time stamp, $t_e$, for face tracking event $f_4$ is shown in 1010. In this case, before sorting (as shown in 1020), the face tracking events are ordered by $f_i$. Then, the face tracking events can be sorted based on the end time stamp for each event, $t_e(f_i)$, resulting in the arrangement after sorting as illustrated in 1040.

Figure 11:
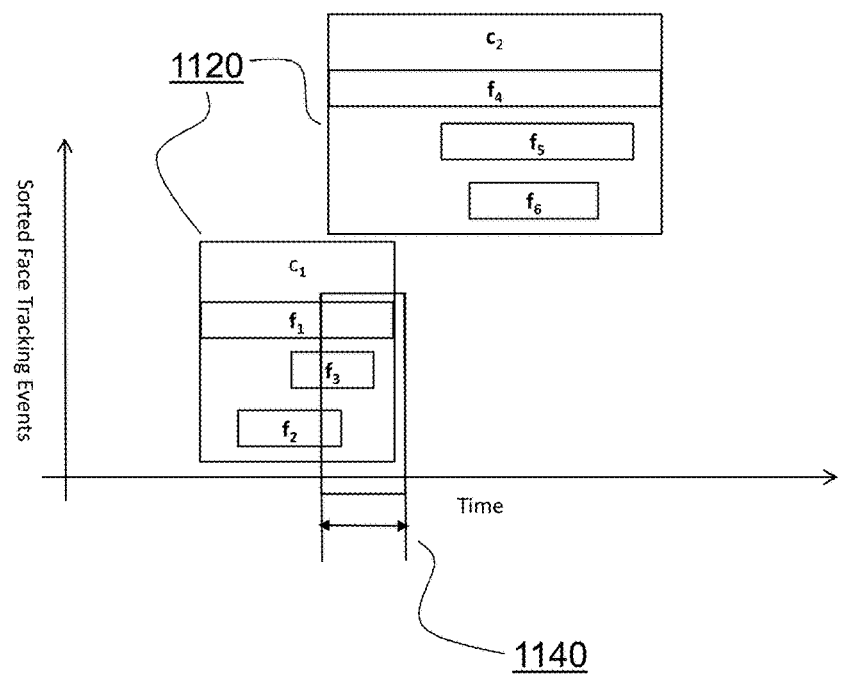
FIG. 11 shows an example of an embodiment of the clustering of the sorted face tracking events.

FIG. 11 shows an example of an embodiment of the clustering of the sorted face tracking events. In order to find the sets of clusters 1120 forming checkout events, $C = \{c_k\}$, the process can loop over each element $f_i$ of F. If the Euclidean distance between the end time stamp of $f_i$ and the center of the existing cluster, $c_k$, dist($f_i, c_k$), is less than a certain threshold (the cluster radius threshold, as illustrated in 1140), then $f_i$ can be put in $c_k$, and the center of $c_k$ can be updated. If not, then the cluster $c_k$ can be closed, a new cluster ($c_{(k+1)}$) can be created, and $f_i$ can be placed in $c_{(k+1)}$. The loop can continue until there are no more face tracking events F to place into a cluster.

In this embodiment, let $t_e(c_i)$ be the end time for a checkout event $c_i$ in C. Then, the checkout event time $t(c_i)$ (known as the checkout time in the previous embodiment) can be designated as a fixed offset from $t_e(c_i)$:

$t(c_i) = t_e(c_i) - \Delta_t$, where $\Delta_t$ is empirically chosen based on checkout observation.

ETS data generated by the embodiment of the Vision-based Checkout Event Detection 114 module, comprising the set of checkout events C and associated checkout event times $t(c_i)$, can then be passed to the Event Database 120.

Event Time Series Clock Alignment

After ETS data for PoS system events and vision-based checkout events are stored in the Database 120, the Event Time Series Clock Alignment 130 module can begin the process of finding event correspondences by aligning the clocks of each ETS. This process can account for the assumption that the event occurrences in each ETS are in order. It can also be assumed that there is a loose clock sync between systems over time, and that the dynamic time drift can be assumed to be negligible over at least the period of interest.

Figure 12:
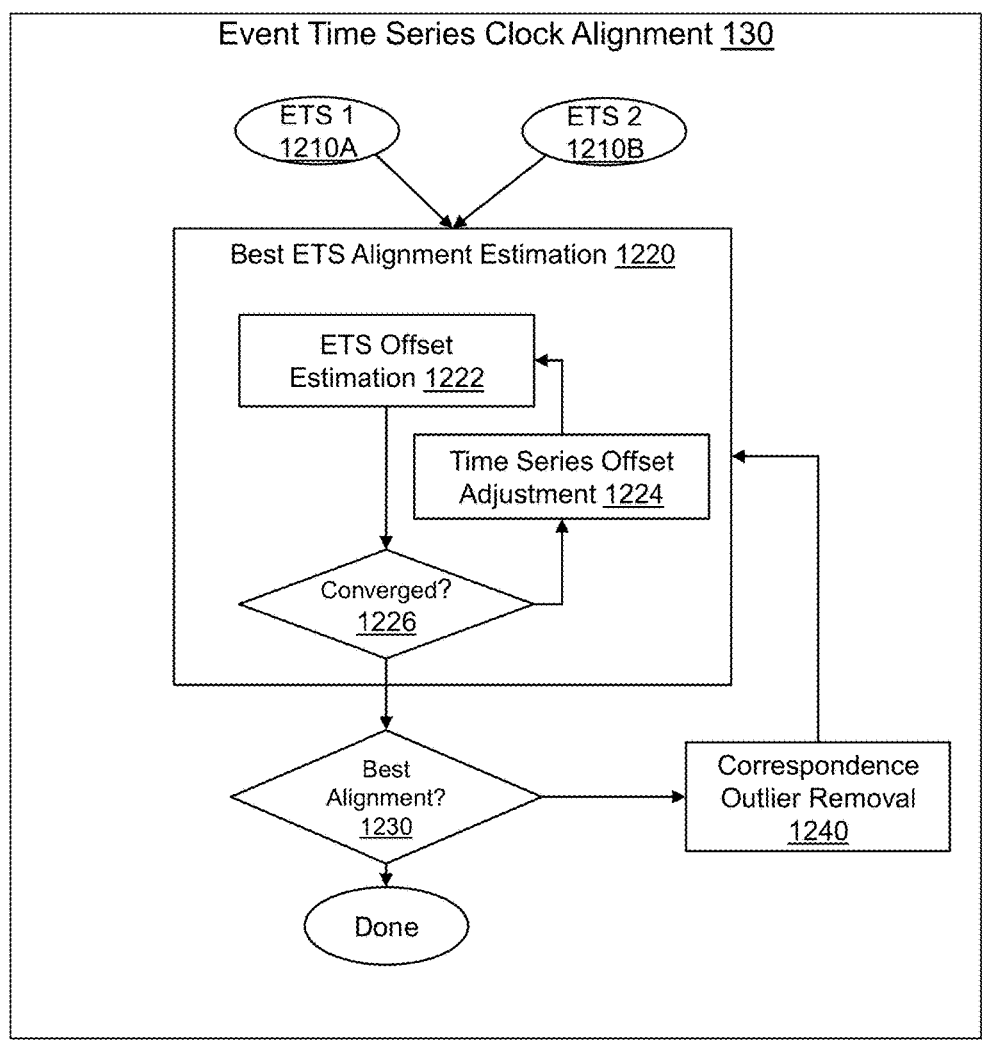
FIG. 12 shows an example block flow diagram of the Event Time Series Clock Alignment module.

In an embodiment illustrated in FIG. 12, the Event Time Series Clock Alignment 130 module can use a discrete, iterative, dynamic time warping (DTW)-like process to align the clocks for each ETS. Given two discrete ETSes, the DTW-like process can find the best time offset (i.e., best alignment, subject to a threshold) between the two ETSes without outliers.

In this embodiment, the process can begin as the two ETSes, ETS 1 1210A, a, and ETS 2 1210B, b, can be sent to the Best ETS Alignment Estimation 1220 module. The ETS Offset Estimation 1222 module can find a warping path W between each corresponding set of events in i in ETS 1 1210A and ETS 2 1210B, where W(i) indicates ith correspondence pair in the warping path W wherein the ith correspondence pair consists of the index of an event in a (that can be represented as W(i).a) and the index of an event in b (that can be represented as W(i).b) and thus a(W(i).a) and b(W(i).b) indicate the event in a and b that belongs to the ith correspondence pair in the warping path W, respectively. A pair of corresponding events joined by a warping path can be called a correspondence pair.

Figure 13:
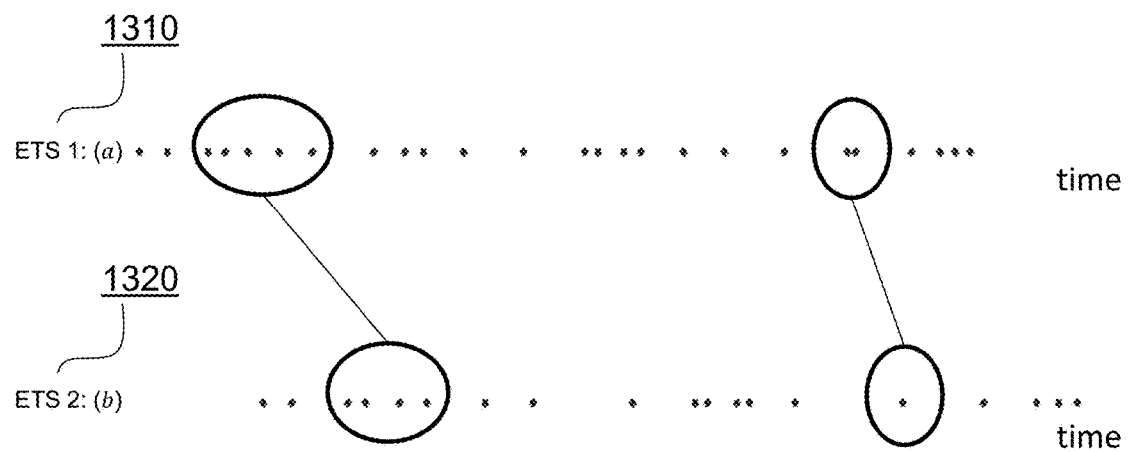
FIG. 13 illustrates an example set of two event time series.

FIG. 13 illustrates an example set of two ETSes, ETS 1 1310 and ETS 2 1320. For this example, ETS 1 1310 shows 25 events from a uniformly, randomly generated ETS in a 10-100 second interval. For this example, ETS 2 1320 is 19 events generated based on ETS 1 with a random perturbation in the time index with random removal and addition of events. It is offset from ETS 1 by 200 seconds.

Figure 14:
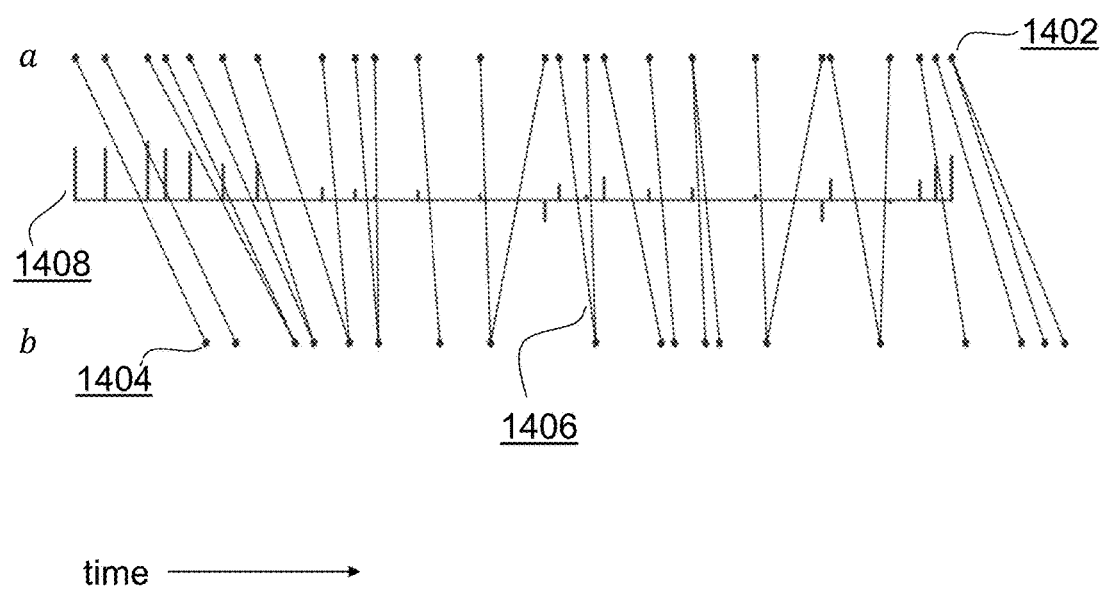
FIG. 14 illustrates the events from the two example time series along with a warping path.

FIG. 14 illustrates the events (shown as points) from the two example ETSes along with a warping path W. In this case, elements (each event) of the first ETS, ETS 1 1310 (a), can be represented by the top set of points 1402, and elements (each of event) of the second ETS, ETS 2 1320 (b), can be represented by the bottom set of points 1404. For this example, time is advancing from left to right. A set of lines 1406 connect points from the first ETS with their corresponding events in the second ETS. It can be noted that multiple events from the first ETS might be associated with a single event in the second ETS. Likewise, a single event in the first ETS might be associated with multiple events in the second ETS. The set of lines 1406 comprise the warping path W.

The module can then compute a distance metric, tdiff(a (W(i).a), b(W(i).b)), representing the time index disparity between the corresponding events. The average and standard deviation of the time index disparity for all events in i can be calculated. An example of the time index disparity between corresponding events can be illustrated graphically by the bars shown along the axis in 1408.

For each iteration of the Best ETS Alignment Estimation 1220 process, the change in standard deviation of the time index disparity between a and b from the previous iteration can then be tested to see if it is less than a predetermined threshold (shown in the convergence check 1226 step). If not (or, automatically for the first iteration), the Time Series Offset Adjustment 1224 module can adjust the time index of b, by subtracting the average time difference. The process can then resume another iteration starting with the ETS Offset Estimation 1222 module. If the change in standard deviation of the time index disparity between a and b from the previous iteration is less than a predetermined threshold, the alignment process can be considered converged and the Best ETS Alignment Estimation 1220 module can be stopped.

The process can then test to determine whether the best alignment of the ETSes has been reached using the Best Alignment 1230 module. The Best Alignment 1230 module can perform two tests, either of which could indicate that the best alignment has been obtained. First, a comparison can be done to determine whether the standard deviation of the time difference disparity for all the events in i that are part of the found correspondences for the current iteration is greater than the standard deviation of the previous iteration. If that is true, the best alignment had been found in the previous iteration, so the Event Time Series Clock Alignment 130 process could be stopped, and the resulting data from the previous iteration passed to the next step, the Event Matching 140 module.

Also as part of the Best Alignment 1230 step, the process can test whether the remaining number of elements (after outlier removal, described below) in a and b are less than a predefined threshold (for example, a threshold could be set to be 50% of the initial number of elements). If that is true, the best alignment has been found, so the Event Time Series Clock Alignment 130 process could be stopped, and the resulting data passed to the next step, the Event Matching 140 module.

If neither test from the Best Alignment 1230 step is true, the process can continue with the Correspondence Outlier Removal 1240 module. First, the correspondence pairs can be sorted in ascending order according to the time difference between them. Then, a predefined portion (for example, in an embodiment, 10%) of the correspondence pairs with larger time differences can be removed from consideration. This can be done to ignore outliers that incur a large association cost. Next, all elements in a and b that are not referred by the remaining inlier correspondence pairs can be removed from consideration. The process then can resume with another iteration of the Best ETS Alignment Estimation 1220 process.

Figure 15:
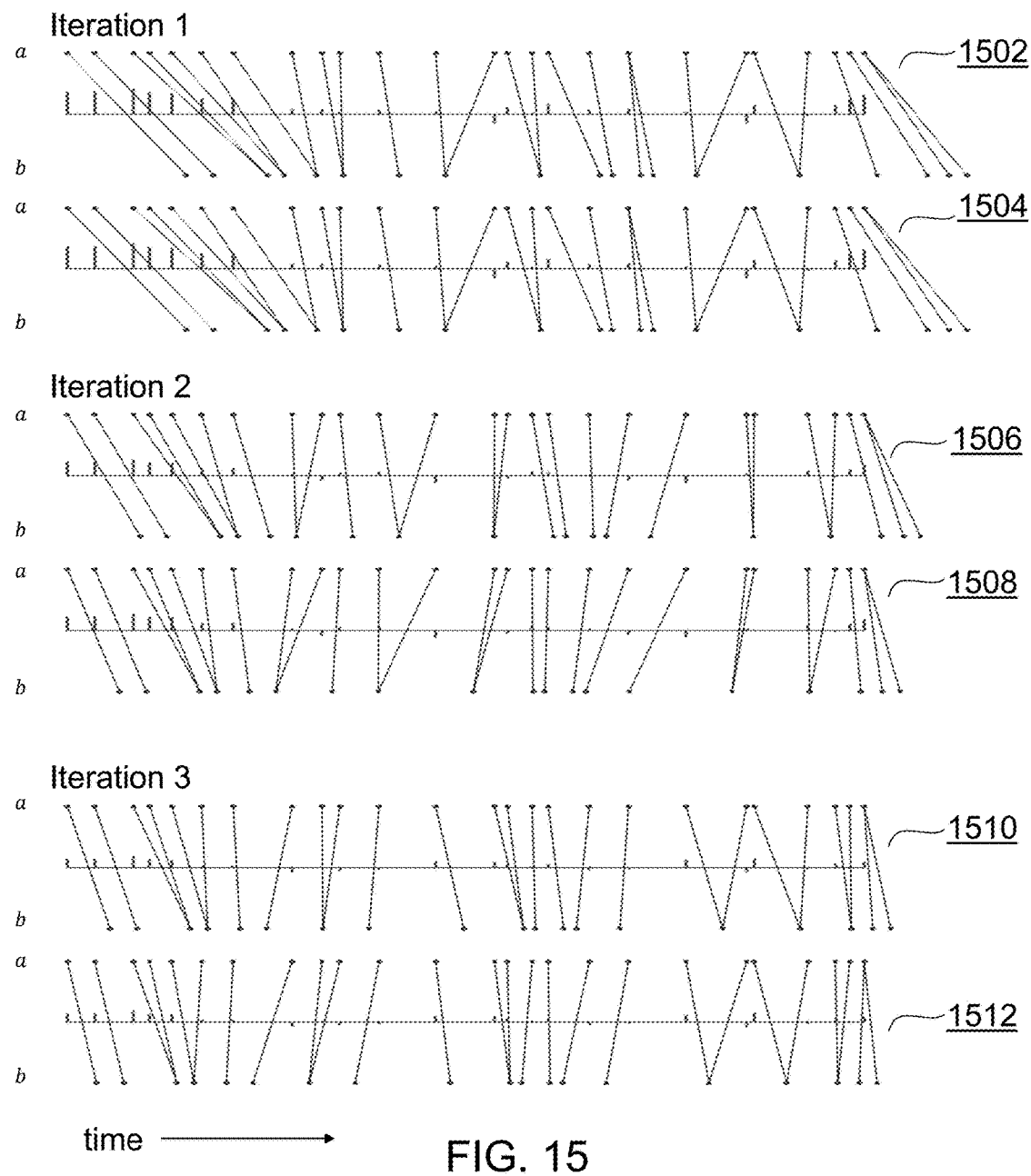
FIGS. 15-17 show an example embodiment for selected iterations of an application of the discrete Event Time Series Clock Alignment module.
Figure 16:
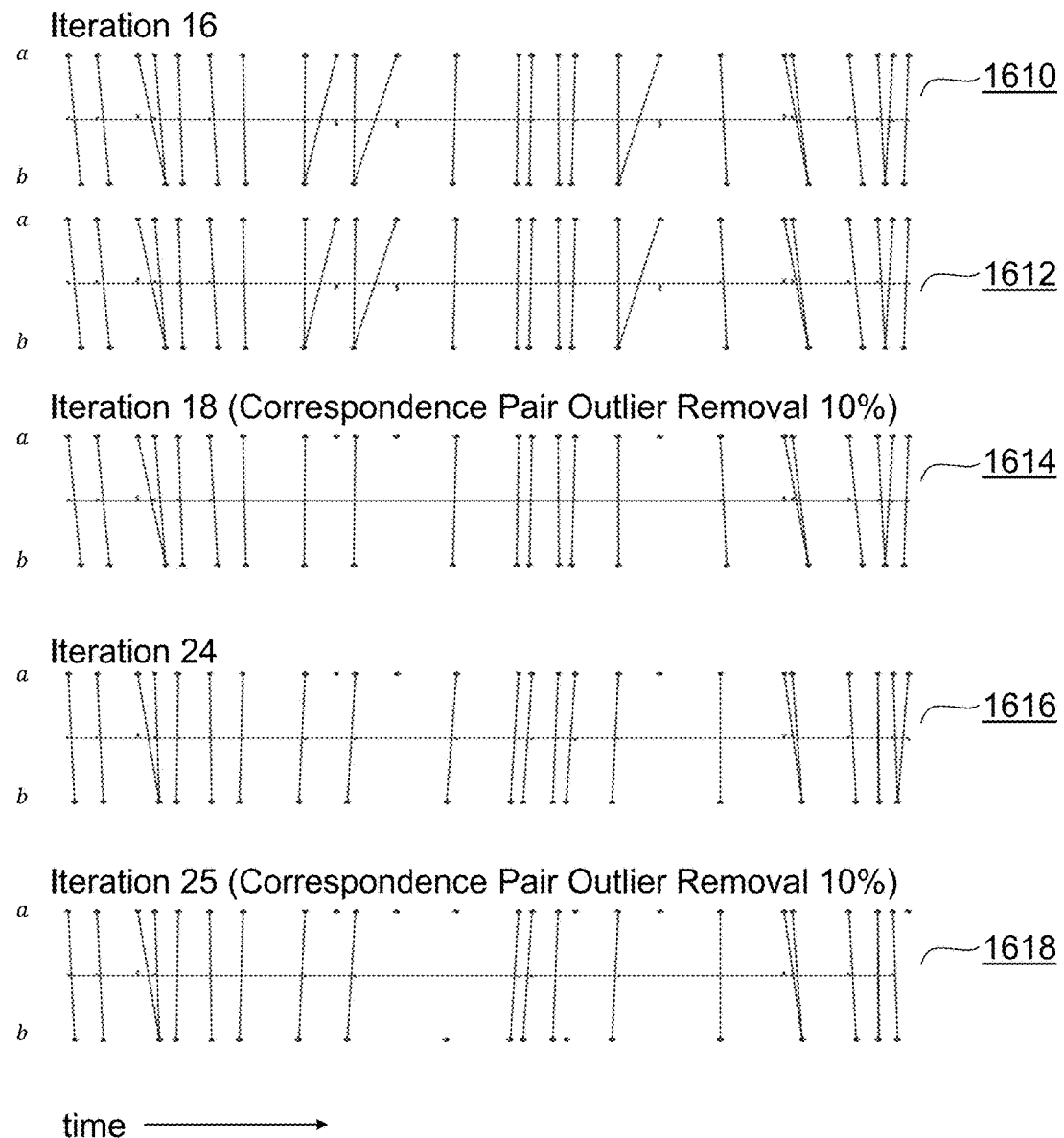
Figure 17:
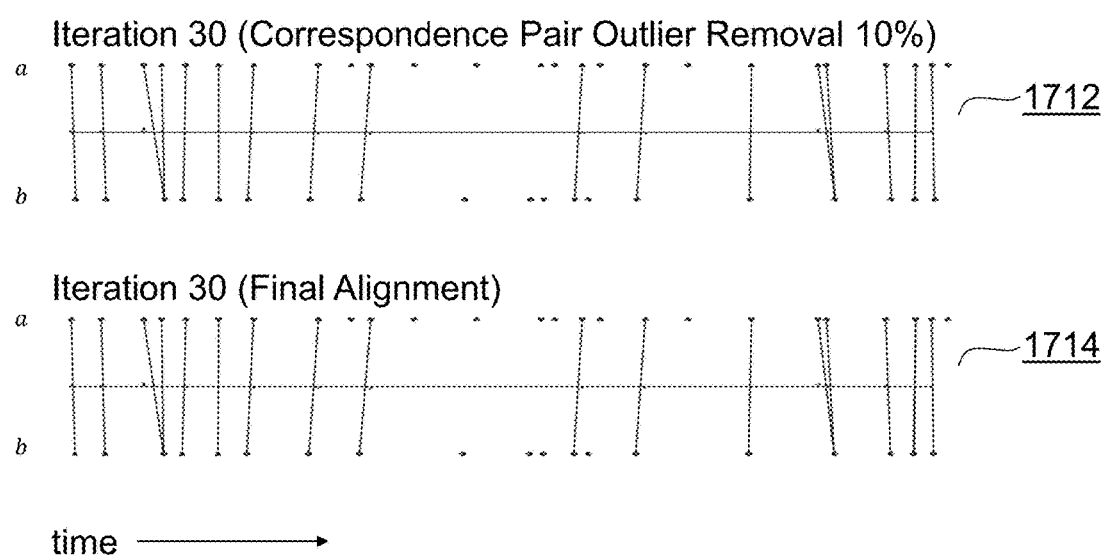

An example embodiment for selected iterations of an application of the discrete Event Time Series Clock Alignment 130 module is shown in FIG. 15, FIG. 16 and FIG. 17. The correspondence pairs for iterations 1, 2, 3, and 16 are shown in 1502, 1506, 1510, and 1610, respectively. The mapping offset for iterations 1, 2, 3, and 16 are shown in 1504, 1508, 1512, and 1612, respectively, as the time index of b (the lower ETS) is adjusted. For this example, removal of 10% of the correspondence pair outliers is shown for iteration 18 in 1614. Then, the mapping offset for iteration 24 is shown in 1616. The removal of 10% of the correspondence pair outliers is shown for iterations 25 and 30 in 1618 and 1712, respectively. Finally, the final alignment of the ETS is shown in 1714. The process was complete after 30 iterations. The final alignment resulted with an offset of ETS 2 1210B by −189.69 sec. For this example, the ground truth offset was −200 sec.

Figure 18:
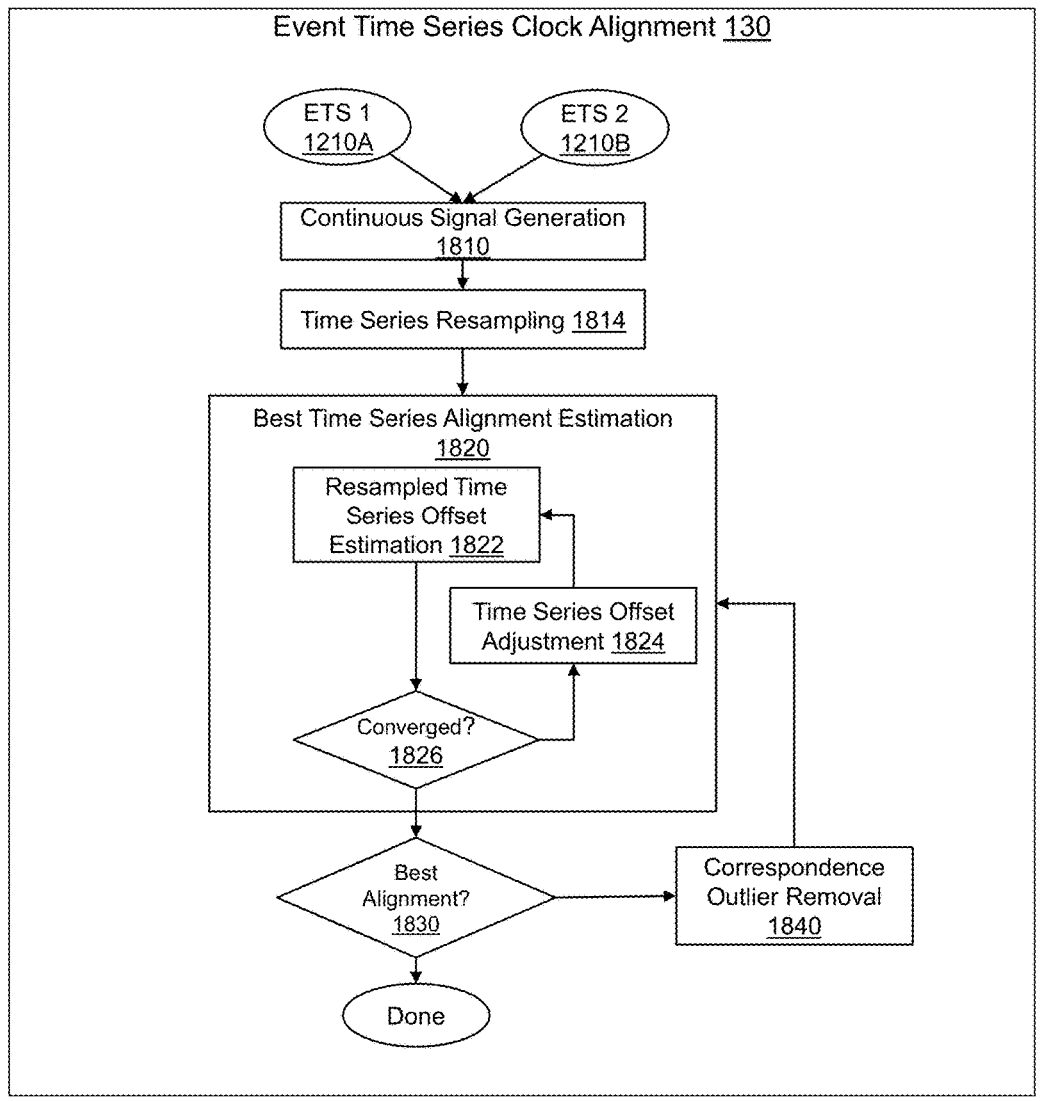
FIG. 18 shows another example embodiment of the Event Time Series Clock Alignment module.

In another embodiment illustrated in FIG. 18, the Event Time Series Clock Alignment 130 module can use ETSes (that are discrete in nature) to construct continuous signal streams for an iterative, dynamic time warping (DTW)-like process to align the clocks for each ETS. Given two discrete ETSes, the DTW-like process can find the best time offset (i.e., best alignment, subject to a threshold) between the two ETSes without outliers.

Figure 19:
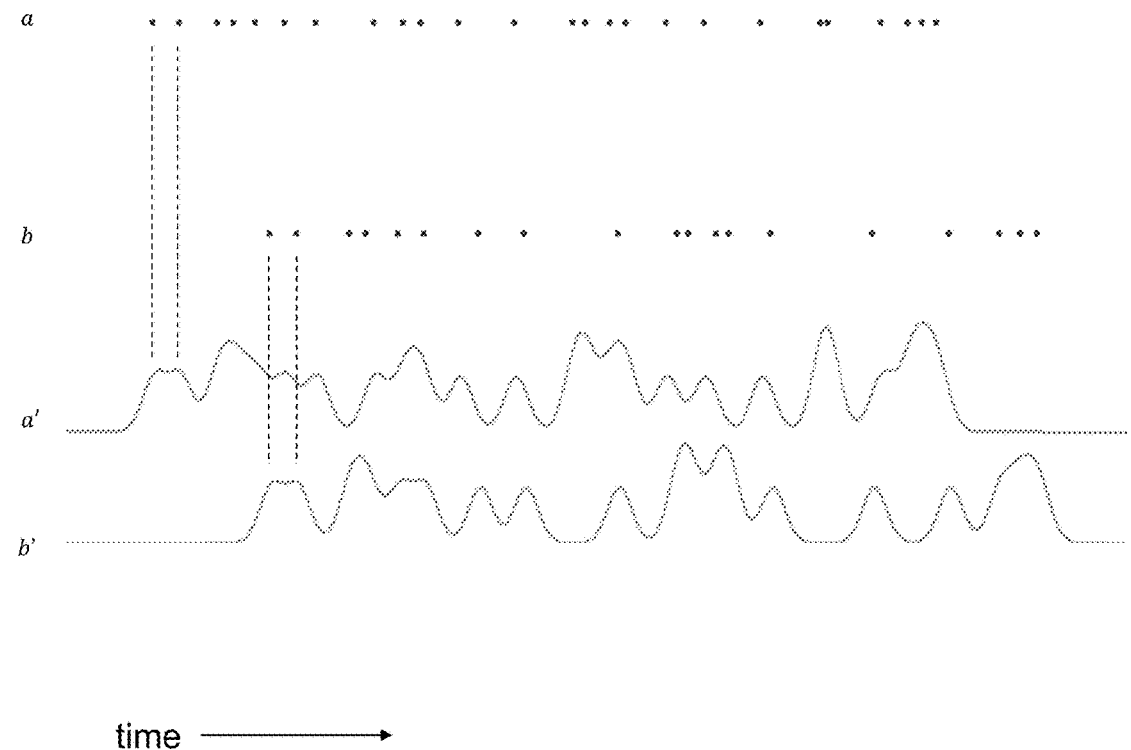
FIG. 19 illustrates a weighted continuous signal stream from each event time series.

In this embodiment, the process can begin as the two ETSes, ETS 1 1210A, a, and ETS 2 1210B, b, can be sent to the Continuous Signal Generation 1810 module. The module can construct continuous signal streams from the set of discrete ETSes by applying a Parzen-window density estimation-like method. The result is a weighted continuous signal stream from each ETS, a' and b', as illustrated in FIG. 19. The weighted continuous signal streams can then be resampled, using the Time Series Resampling 1814 module, to create two new ETSes, a" and b", with uniform sampling.

The process can then proceed as the two uniformly sampled ETSes can be sent to the Best Time Series Alignment Estimation 1820 module. The Resampled Time Series Offset Estimation 1822 module can find a warping path W between each corresponding set of points in i in the ETS, which can be written as a"(W(i).a) and b"(W(i).b). A pair of corresponding points joined by a warping path can be called a correspondence pair.

A DTW-like algorithm takes the weights of the sampled points as an input to find the correspondences between the two ETSes generated by sampling the continuous ETSes. The module can then compute a distance metric, tdif f (a"(W(i).a), b"(W(i).b)), representing the time index disparity between the corresponding points. The average and standard deviation of the time index disparity for all points in i can be calculated.

The change in standard deviation of the time index disparity between a" and b" from the previous iteration can then be tested to see if it is less than a predetermined threshold (convergence check 1826). If not (or, automatically for the first iteration), the Time Series Offset Adjustment 1824 module can adjust the time index of b" by subtracting the average time difference. The process can then resume another iteration starting with the Resampled Time Series Offset Estimation 1822 module. If the change in standard deviation of the time index disparity between a" and b" from the previous iteration is less than a predetermined threshold, the alignment process can be considered converged and the Best Time Series Alignment Estimation 1820 module can be stopped.

The process can then test to determine whether the best alignment of a" and b" has been reached using the Best Alignment 1830 module. The Best Alignment 1830 module can perform two tests, either of which could indicate that the best alignment has been obtained. First, a comparison can be done to determine whether the standard deviation of the time difference disparity for all points in i for the current iteration is greater than the standard deviation of the previous iteration. If that is true, the best alignment had been found in the previous iteration, so the Event Time Series Clock Alignment 130 process could be stopped, and the resulting data from the previous iteration passed to the next step, the Event Matching 140 module.

Also as part of the Best Alignment 1830 step, the process can test whether the remaining number of elements (after outlier removal, described below) in a" and b" are less than a predefined threshold (for example, a threshold could be set to be 50% of the initial number of elements if assuming that at least 50% of the elements must be inliers). If that is true, the best alignment can be considered to be found, so the Event Time Series Clock Alignment 130 process could be stopped, and the resulting data passed to the next step, the Event Matching 140 module.

If neither test from the Best Alignment 1830 step is true, the process can continue with the Correspondence Outlier Removal 1840 module. First, the correspondence pairs can be sorted in ascending order according to the time difference between them. Then, a predefined portion (for example, in an embodiment, 10%) of the correspondence pairs can be removed from consideration. This can be done to ignore outliers that incur a large association cost. Next, all elements in a" and b" that are not referred by the remaining inlier correspondence pairs can be removed from consideration. The process then can resume with another iteration of the Best ETS Alignment Estimation 1820 process.

Figure 20:
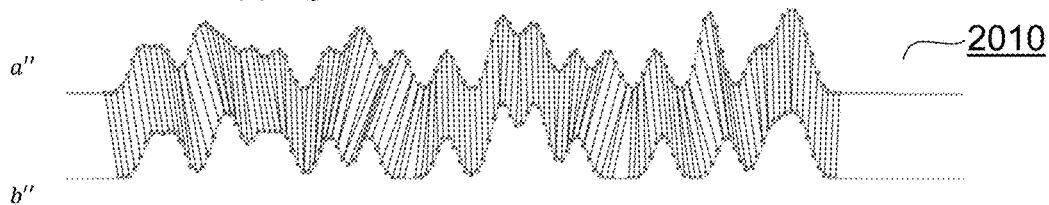
FIGS. 20-21 show an example embodiment for selected iterations of an application of the continuous Event Time Series Clock Alignment module.
Figure 20:
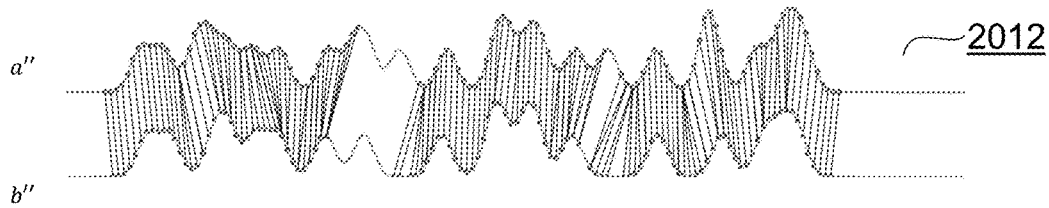
Figure 20:
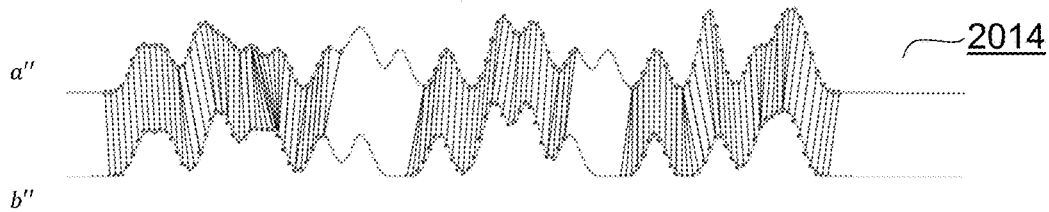
Figure 20:
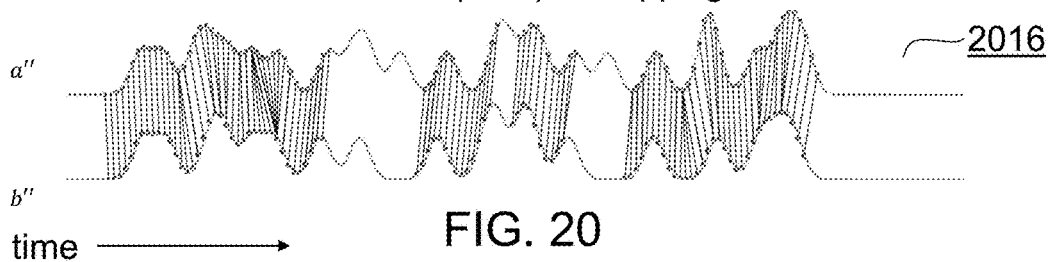
Figure 21:
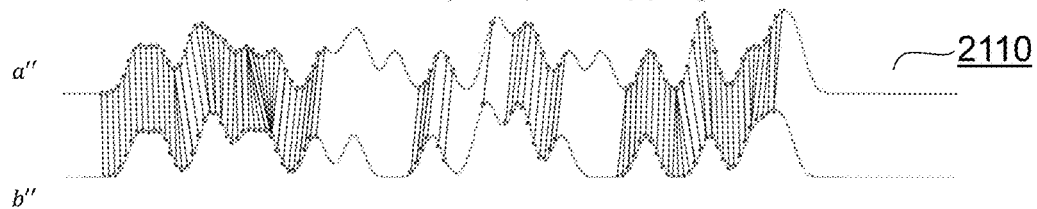
Figure 21:
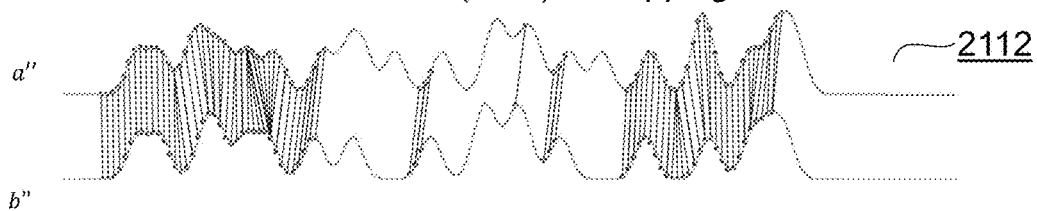
Figure 21:
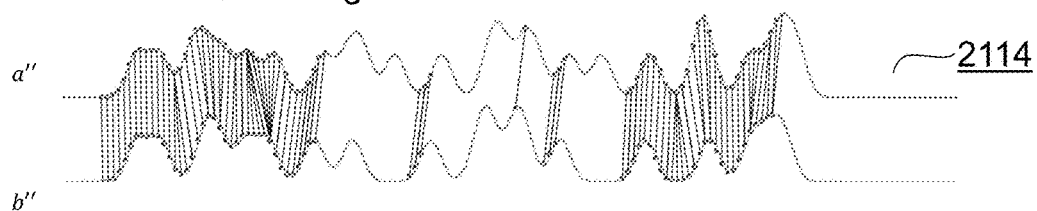

An example embodiment for selected iterations of an application of the continuous Event Time Series Clock Alignment 130 module is shown in FIG. 20 and FIG. 21. The mapping offset for iteration 1 is shown in 2010, as the time index of b" (the lower ETS) is adjusted. For this example, removal of 10% of the correspondence pair outliers, along with the mapping offset for iterations 3, 5, 7, 9, and 11 are shown in 2012, 2014, 2016, 2110, and 2112, respectively. Finally, the final alignment of the ETS is shown in 2114. The process was complete after 13 iterations. The final alignment resulted with an offset of ETS 2 710B by −194.94 sec. For this example, the ground truth offset was −200 sec.

Event Matching

In an embodiment, the PoS ETS can be called P and the vision-based checkout ETS can be called C. As P can be warped to minimize the offset between P and C (as described above), the new, warped, PoS ETS can be P'.

The Event Matching 140 module can find a match between events of P' and C. It can evaluate each vision-based checkout event in C, where for each event $c_i$, $t(c_i)$ can be the event time (i.e., checkout event time) for $c_i$. Further, $t(p'_1)$ can be the time of a PoS event $p'_j$ in P'. The module can loop over each vision-based checkout event in C to find the $p'_j$ that minimizes the absolute time difference to $c_i$, as $$p'_j = \mathrm{argmin}_j(|t(p'_j) - t(c_i)|).$$

If $|t(p'_j) - t(c_i)|$ is larger than a threshold, then there can not be an association to any PoS event, and $c_i$ can be rejected. If $|t(p'_1) - t(c_i)|$ is smaller than a threshold, then $c_i$ can be matched to $p'_j$. The loop can continue until there are no events left in C. The resulting match of at least one vision-based checkout event with a PoS event can be a checkout event association pair, $(c_i, p_j)$. It should be noted that there can be a possibility that some vision-based checkout events are not matched to a PoS event, and vice-versa.

Transaction Owner Identification

Figure 22:
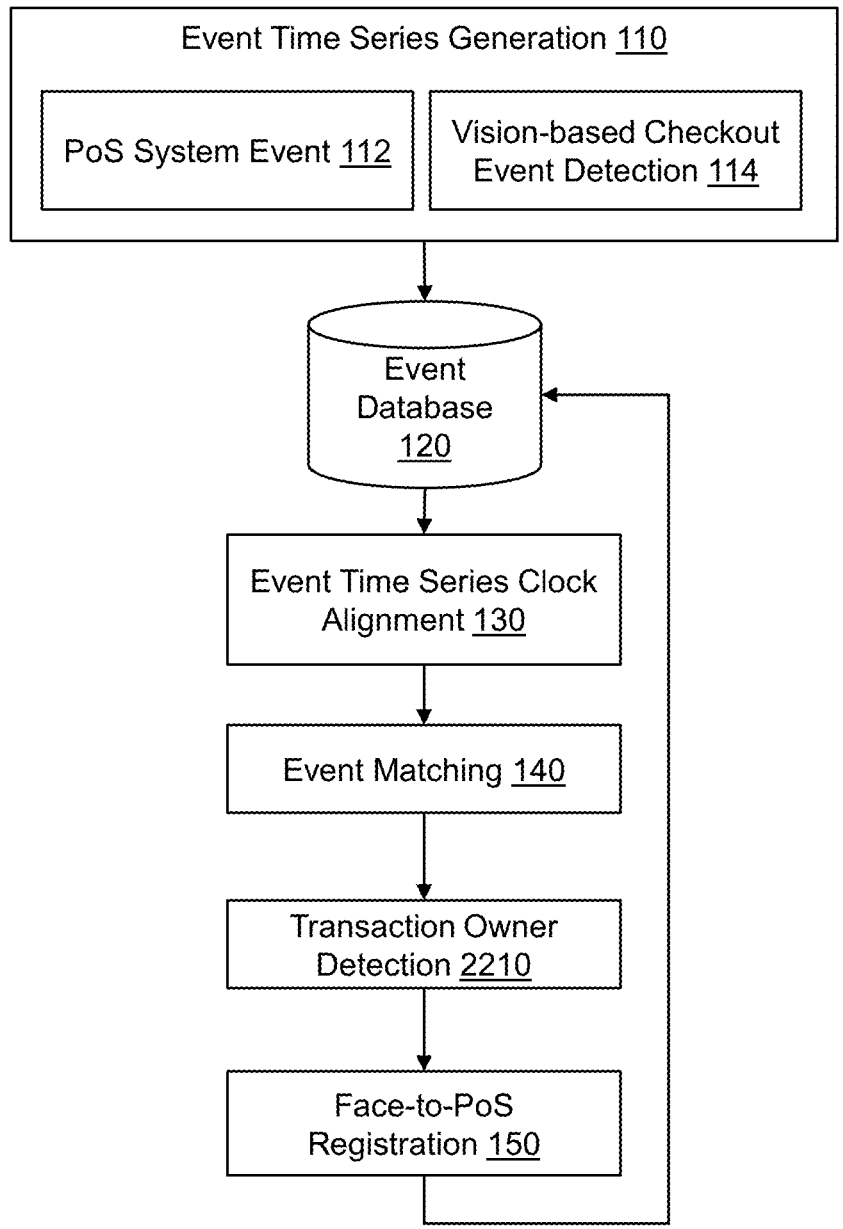
FIG. 22 illustrates an embodiment of the process where an embodiment of the Transaction Owner Detection module can be placed after the Event Matching module.

FIG. 22 illustrates an alternative embodiment of the process where an embodiment of the Transaction Owner Detection 2210 module can be placed after the Event Matching 140 module. In this embodiment, the transaction owner face can be found for each checkout event association pair, $(c_i, p_i)$.

In the embodiment, for each checkout event association pair, $(c_i, p_i)$, the best estimate of the transaction owner in $c_i$ can be found. For each face $f_k$ in $c_i$, a likelihood that the face belongs to the transaction owner can be calculated for $$L(f_k, p'_j) = l_d(f_k) + l_c(f_k, p'_j).$$

Figure 23:
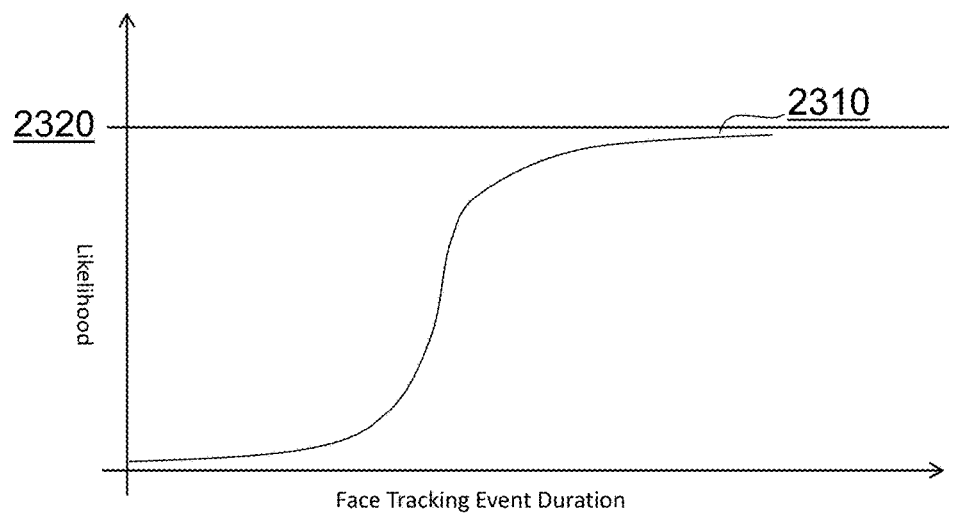
FIG. 23 illustrates the upper limit of the likelihood of face tracking duration.

The calculation of $l_d(f_k)$ is the likelihood based on face tracking duration. In this case, the longer the duration of a tracked face, the higher the likelihood that the tracked face belongs to the transaction owner, to an upper limit. FIG. 23 illustrates the sigmoidal transfer function 2320 that can be used to calculate the likelihood, in an embodiment. The upper limit of the likelihood is shown in 2320. This likelihood can be supported by the rationale that the transaction owner stays inside the tracked checkout area longer than others.

Figure 24:
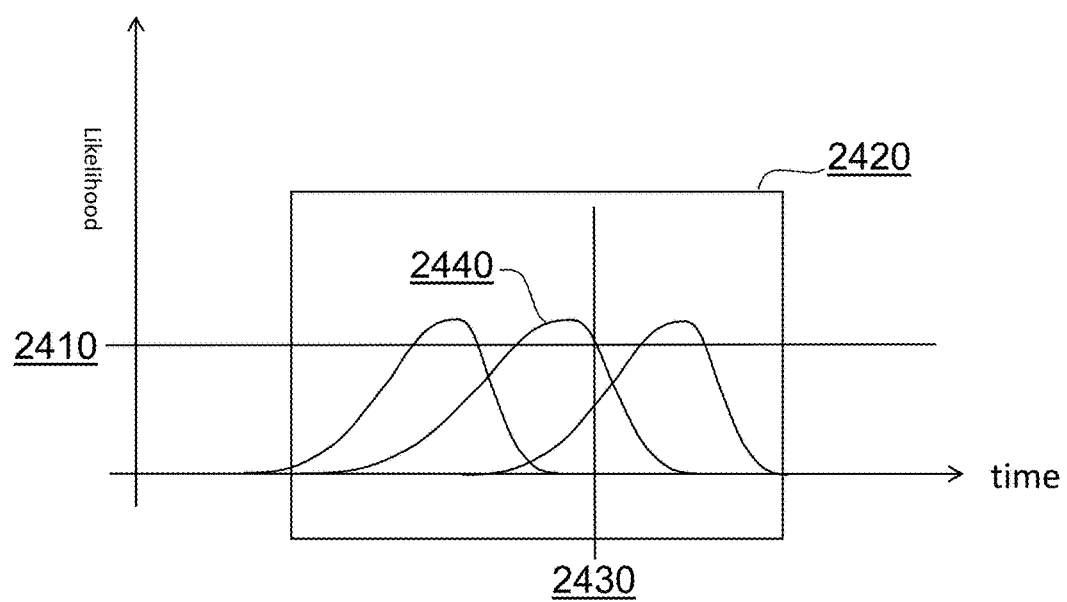
FIG. 24 illustrates the calculation of the likelihood of closeness to the PoS time.

The calculation of $l_c(f_k, p'_j)$ 2410 is the likelihood based on closeness to the PoS time, as illustrated in FIG. 24. In this case, for a checkout event 2420 (consisting of a group of face tracking events 2440; for this example, modeled using the asymmetric likelihood function) matched to a PoS time 2430, the face tracking event 2440 with a transaction time that is closer to the matching PoS time can have a higher likelihood of belonging to the transaction owner.

The face that has the highest likelihood of being the transaction owner, $f_{to}$, can be calculated using $f_{to} = \text{argmax}_k (L(f_k, p'_j))$. Data indicating the transaction owner can be saved with the checkout association pair for storage in the Event Database 120.

Face-to-PoS Registration

Figure 25:
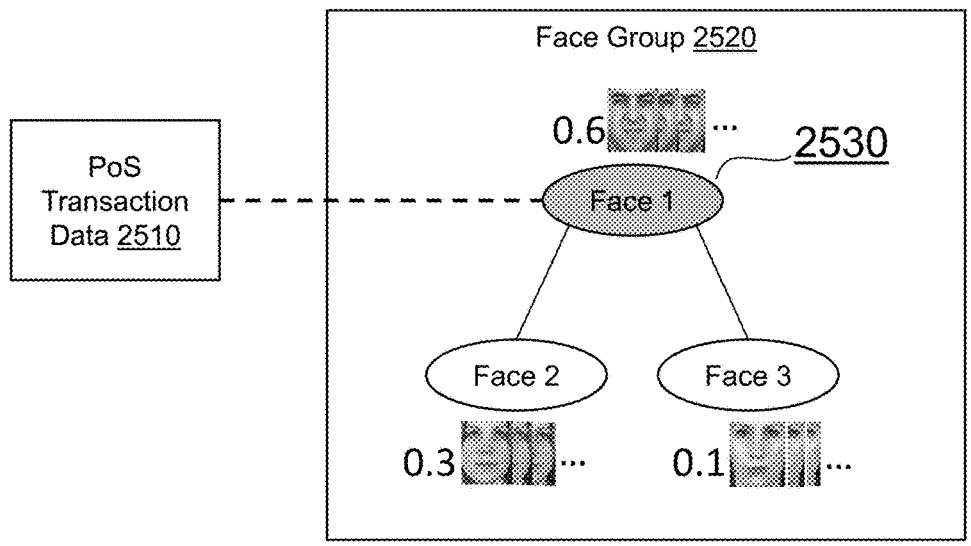
FIG. 25 shows an example of the result of an embodiment of the Face-to-PoS Registration module.

FIG. 25 shows an example of the result of an embodiment of the Face-to-PoS Registration 150 module. In the embodiment, the face or face group matched with each checkout association pair, $(c_i, p_i)$, can be associated. In this example, PoS Transaction Data 2510 can be associated with a Face Group 2520. Further, the PoS transaction data can also be associated with the transaction owner 2530 that is part of the matched face group. The resulting PoS-to-face association can then be stored in the Event Database 120.

Hardware Configuration

One of ordinary skill in the art would recognize that the sets of cameras utilized for the exemplary embodiments, for example as illustrated in FIG. 4, can be ordinary surveillance cameras, high-definition cameras, low-cost surveillance cameras, infrared cameras, or other image detection devices. A preferred embodiment of the present invention has the cameras configured as to be installed in the ceiling of a physical location, but one skilled in the art would understand that the cameras could be installed in other locations, such as the walls of the location, behind a mirror, on or associated with a display, aisle or shelf hardware, or railing.

The cameras and associated hardware can be connected by a wired network, including, but not limited to, an Ethernet based network. The cameras and associated hardware can also be connected by a wireless network, including, but not limited to, a Wi-Fi network, Bluetooth network, nearfield communications (NFC) network, or other type of wireless network. A wired or wireless network can be controlled by a central server or each device can operate as an independent, "Internet of things" device. The network can be connected to the Internet to transfer data, including, but not limited to, raw data and processed data and analytics, to a remote location.

The computing hardware utilized to implement the processes and modules used in the present invention can be configured and controlled via a user-input device, including, but not limited to, a keyboard, mouse, trackpad, trackball, or remote control. Additionally, the hardware can be configured and controlled via remote access through a secure Internet connection. Any data captured and created, including both raw data and processed data and analytics, by the system can be output to a user using a display, printout, or transmitted to a remote location for further analysis.

Figure 26:
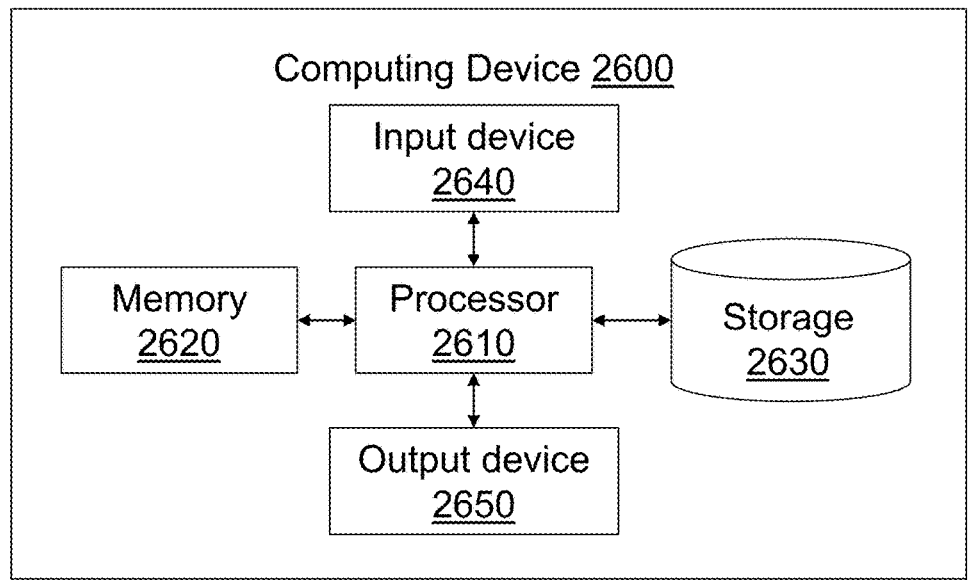
FIG. 26 shows an example computing device illustration.

FIG. 26 shows an example of a generic computer device or a generic mobile computer device, which may be used to implement the processes and modules of the present invention. The computer devices can include many forms of devices, such as desktops, workstations, servers, laptops, personal computers, personal digital assistants, single board computers such as the Raspberry Pi, and other computing devices. Mobile computing devices can include cellular telephones, smartphones, personal digital assistants, or other mobile devices. It should be understood that the computing devices and mobile computing devices listed are exemplary, and not intended to limit the implementation of the processes and modules disclosed in the present invention.

The computing device 2600 includes a processor 2610, memory 2620 (such as Random Access Memory or RAM), storage 2630 (such as a hard disk drive), input device 2640 (such as a keyboard, trackball, trackpad, or mouse), and output device 2650 (such as a CRT, LCD, or other type of display device, and an auditory device such as speakers).

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for associating at least an image of a face of at least a person with Point-of-Sale (PoS) data by aligning a first event time series with a second event time series based on a dynamic time disparity, and utilizing at least a camera and at least a processor for executing the steps comprising:
   a. generating a first event time series using an Event Time Series Generation module,
   b. generating a second event time series using the Event Time Series Generation module,
   c. aligning the first event time series with the second event time series based on the dynamic time disparity between the time series, using an Event Time Series Clock Alignment module, comprising the steps of:
      i. performing a dynamic time warping to find a warping path between corresponding events between the first event time series and the second event time series, wherein the dynamic time warping can be one of a discrete dynamic time warping or a continuous dynamic time warping,
      ii. checking for convergence by determining whether the standard deviation of a time difference between corresponding events in the first event time series and the second event time series is less than a predetermined threshold,
      iii. adjusting the time index of the second event time series based on the time disparity between the event time series,
      iv. testing the alignment of the time series to see if the best alignment has been obtained,
      v. sorting the corresponding events based on the time disparity between events, and removing outliers that have a time disparity greater than a threshold, and
      vi. repeating the Event Time Series Clock Alignment module steps until the best alignment is obtained,
   d. matching first time series events with second time series events based on the alignment of the time series, using an Event Matching module,
   e. registering face images from a series of checkout events to a series of PoS events using a Face-to-PoS Registration module, and
   f. storing the time series and registration data in a database.

2. The method of claim 1, wherein the first event time series is comprised of a plurality of checkout events and associated timestamps, and wherein the second event time series is comprised of a plurality of PoS events.

3. The method of claim 2, wherein the first event time series is further comprised of a set of face images along with a timestamp for each image, and wherein the face images are of persons identified as participating in a checkout event.

4. The method of claim 3, further comprising: determining a transaction owner for a checkout event, determining a checkout time, and generating a face group from the face images for each checkout event.

5. The method of claim 4, wherein the checkout time is determined by calculating a maximum likelihood for the checkout event time, wherein the maximum likelihood is calculated by finding the highest probability across one of a Gaussian distribution, asymmetric Gaussian distribution, or logisitic distribution.

6. The method of claim 4, wherein the face group is comprised of face images that are identified as moving through a checkout area at the same time.

7. The method of claim 4, further comprising the generation of a tree illustrating the relationship of the face images in the face group with the transaction owner.

8. The method of claim 1, wherein the Event Matching module further comprises finding the PoS event that minimizes the absolute time difference to each checkout event to form a checkout event association pair.

9. A system for associating at least an image of a face of at least a person with Point-of-Sale (PoS) data by aligning a first event time series with a second event time series based on a dynamic time disparity, and utilizing at least a camera and at least a processor for executing the steps comprising:
   a. generating a first event time series using an Event Time Series Generation module,
   b. generating a second event time series using the Event Time Series Generation module,
   c. aligning the first event time series with the second event time series based on the dynamic time disparity between the time series, using an Event Time Series Clock Alignment module,
   d. comprising the steps of:
      i. performing a dynamic time warping to find a warping path between corresponding events between the first event time series and the second event time series, wherein the dynamic time warping can be one of a discrete dynamic time warping or a continuous dynamic time warping,
      ii. checking for convergence by determining whether the standard deviation of a time difference between corresponding events in the first event time series and the second event time series is less than a predetermined threshold,
      iii. adjusting the time index of the second event time series based on the time disparity between the event time series,
      iv. testing the alignment of the time series to see if the best alignment has been obtained,
      v. sorting the corresponding events based on the time disparity between events, and removing outliers that have a time disparity greater than a threshold, and
      vi. repeating the Event Time Series Clock Alignment module steps until the best alignment is obtained,
   e. matching first time series events with second time series events based on the alignment of the time series, using an Event Matching module,
   f. registering face images from a series of checkout events to a series of PoS events using a Face-to-PoS Registration module, and
   g. storing the time series and registration data in a database.

10. The system of claim 9, wherein the first event time series is comprised of a plurality of checkout events and associated timestamps, and wherein the second event time series is comprised of a plurality of PoS events.

11. The system of claim 10, wherein the first event time series is further comprised of a set of face images along with a timestamp for each image, and wherein the face images are of persons identified as participating in a checkout event.

12. The system of claim 11, further comprising: determining a transaction owner for a checkout event, determining a checkout time, and generating a face group from the face images for each checkout event.

13. The system of claim 12, wherein the checkout time is determined by calculating a maximum likelihood for the checkout event time, wherein the maximum likelihood is calculated by finding the highest probability across one of a Gaussian distribution, asymmetric Gaussian distribution, or logisitic distribution.

14. The system of claim 12, wherein the face group is comprised of face images that are identified as moving through a checkout area at the same time.

15. The system of claim 12, further comprising the generation of a tree illustrating the relationship of the face images in the face group with the transaction owner.

16. The system of claim 9, wherein the Event Matching module further comprises finding the PoS event that minimizes the absolute time difference to each checkout event to form a checkout event association pair.

\* \* \* \* \*